United States Patent
Mittelsteadt et al.

(10) Patent No.: US 9,595,727 B2
(45) Date of Patent: Mar. 14, 2017

(54) ELECTROCHEMICAL DEVICE COMPRISING AN ELECTRICALLY-CONDUCTIVE, SELECTIVELY-PERMEABLE MEMBRANE

(75) Inventors: Cortney K. Mittelsteadt, Wayland, MA (US); Castro S. T. Laicer, Watertown, MA (US); Katherine E. Harrison, North Cambridge, MA (US); Bryn M. McPheeters, Gothenburg, NE (US)

(73) Assignee: GINER, INC., Newton, MA (US)

(*) Notice: Subject to any disclaimer, the term of this patent is extended or adjusted under 35 U.S.C. 154(b) by 559 days.

(21) Appl. No.: 13/373,512

(22) Filed: Nov. 16, 2011

(65) Prior Publication Data

US 2012/0237848 A1 Sep. 20, 2012

Related U.S. Application Data

(60) Provisional application No. 61/458,042, filed on Nov. 16, 2010.

(51) Int. Cl.
*H01M 4/86* (2006.01)
*H01M 4/88* (2006.01)
(Continued)

(52) U.S. Cl.
CPC ......... *H01M 8/1039* (2013.01); *C25B 13/04* (2013.01); *H01M 4/8807* (2013.01); *H01M 8/023* (2013.01); *Y02E 60/523* (2013.01)

(58) Field of Classification Search
CPC ..... C25B 13/04; H01M 8/023; H01M 8/1039; H01M 4/8807
(Continued)

(56) References Cited

U.S. PATENT DOCUMENTS 3,282,875 A 11/1966 Connolly et al.
3,418,168 A 12/1968 Wentworth
(Continued)

OTHER PUBLICATIONS de Heer et al., Aligned Carbon Nanotube Films: Production and Optical and Electronic Properties, May 1995, Science, 268, 845-846.*

(Continued)

*Primary Examiner* — Sean P Cullen
(74) *Attorney, Agent, or Firm* — Kriegsman & Kriegsman

(57) ABSTRACT

An electrochemical device, such as a fuel cell or an electrolyzer. In one embodiment, the electrochemical device includes a membrane electrode assembly (MEA), an anodic gas diffusion medium in contact with the anode of the MEA, a cathodic gas diffusion medium in contact with the cathode, a first bipolar plate in contact with the anodic gas diffusion medium, and a second bipolar plate in contact with the cathodic gas diffusion medium. Each of the bipolar plates includes an electrically-conductive, non-porous, liquid-permeable, substantially gas-impermeable membrane in contact with its respective gas diffusion medium, the membrane including a solid polymer electrolyte and a non-particulate, electrically-conductive material, such as carbon nanotubes, carbon nanofibers, and/or metal nanowires. In addition, each bipolar plate also includes an electrically-conductive fluid chamber in contact with the electrically-conductive, selectively-permeable membrane and further includes a non-porous and electrically-conductive plate in contact with the fluid chamber.

54 Claims, 18 Drawing Sheets

(51) Int. Cl.
*H01M 8/02* (2016.01)
*H01M 8/04* (2016.01)
*H01M 8/10* (2016.01)
*C25B 13/04* (2006.01)
*C25B 9/06* (2006.01)
*C25B 9/08* (2006.01)
*C25B 9/10* (2006.01)

(58) Field of Classification Search
USPC ......... 429/480; 204/252, 253; 977/750, 752, 977/762
See application file for complete search history.

(56) References Cited

U.S. PATENT DOCUMENTS

| | | | |
|---|---|---|---|
| 3,981,745 | A | 9/1976 | Stedman |
| 4,257,867 | A | 3/1981 | Hammond et al. |
| 4,470,889 | A | 9/1984 | Ezzell et al. |
| 4,478,695 | A | 10/1984 | Ezzell et al. |
| 4,543,303 | A | 9/1985 | Dantowitz et al. |
| 4,619,753 | A | 10/1986 | Christen et al. |
| 4,678,724 | A | 7/1987 | McElroy |
| 4,729,932 | A | 3/1988 | McElroy |
| 5,800,796 | A | 9/1998 | Webb et al. |
| 6,051,643 | A | 4/2000 | Hasegawa et al. |
| 6,080,503 | A | 6/2000 | Schmid et al. |
| 6,171,720 | B1 | 1/2001 | Besmann et al. |
| 6,179,986 | B1 | 1/2001 | Swette et al. |
| 6,379,827 | B1 | 4/2002 | Cipollini |
| 6,492,431 | B1 | 12/2002 | Cisar |
| 6,558,824 | B1 | 5/2003 | Muchnic et al. |
| 6,808,838 | B1 | 10/2004 | Wilson |
| 6,811,905 | B1 | 11/2004 | Cropley et al. |
| 6,833,207 | B2 | 12/2004 | Joos et al. |
| 6,838,205 | B2 | 1/2005 | Cisar et al. |
| 6,887,601 | B2 | 5/2005 | Moulthrop, Jr. et al. |
| 7,220,513 | B2 | 5/2007 | Rohwer et al. |
| 8,551,670 | B2 | 10/2013 | Mittelsteadt et al. |
| 2002/0071980 | A1 | 6/2002 | Tabata et al. |
| 2002/0093651 | A1 | 7/2002 | Roe |
| 2005/0221141 | A1 | 10/2005 | Hampden-Smith et al. |
| 2005/0233203 | A1 | 10/2005 | Hampden-Smith et al. |
| 2006/0078784 | A1 | 4/2006 | Liu et al. |
| 2006/0172179 | A1 | 8/2006 | Gu et al. |
| 2006/0183011 | A1 | 8/2006 | Mittelsteadt et al. |
| 2006/0269824 | A1 | 11/2006 | Hampden-Smith et al. |
| 2007/0166586 | A1 | 7/2007 | Marchand et al. |
| 2008/0090108 | A1* | 4/2008 | Uchida et al. ................ 429/12 |
| 2008/0220309 | A1 | 9/2008 | Choi et al. |
| 2009/0220845 | A1 | 9/2009 | Mittelsteadt et al. |
| 2010/0183951 | A1 | 7/2010 | Lu et al. |
| 2014/0065510 | A1 | 3/2014 | Mittelsteadt et al. |

OTHER PUBLICATIONS

Kocha et al., "Characterization of Gas Crossover and Its Implications in PEM Fuel Cells," AIChE Journal, 52 (5):1916-25 (2006).
DOE Presentation entitled "Electrochemical Hydrogen Compressor," Ludwig Lipp, FuelCell Energy, Inc. (May 17, 2012) 20 pages.
Oliver et al., "Mechanical properties of non-functionalized multiwall nanotube reinforced polycarbonate at 77 K," Nanotechnology, 19:1-8 (2008).

* cited by examiner

FIG. 15(a)
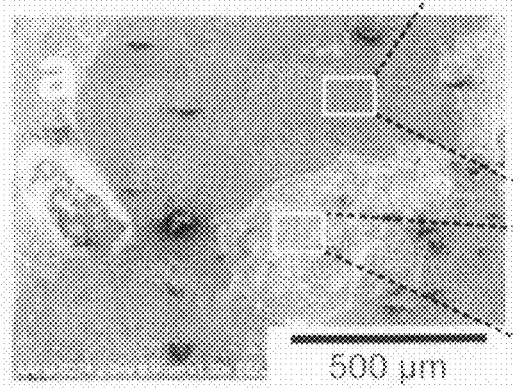
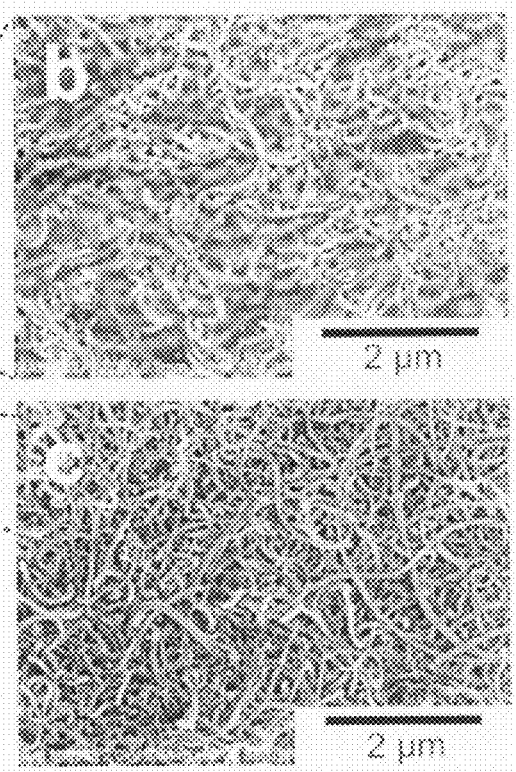
FIG. 15(b)
FIG. 15(c)

ELECTROCHEMICAL DEVICE COMPRISING AN ELECTRICALLY-CONDUCTIVE, SELECTIVELY-PERMEABLE MEMBRANE

CROSS-REFERENCE TO RELATED APPLICATIONS

The present application claims the benefit under 35 U.S.C. 119(e) of U.S. Provisional Patent Application Ser. No. 61/458,042, filed Nov. 16, 2010, the disclosure of which is incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. NNX10CD40P awarded by NASA.

BACKGROUND OF THE INVENTION

The present invention relates generally to electrochemical devices and relates more particularly to electrochemical devices of the type comprising a solid proton exchange membrane.

Electrochemical devices of the type comprising a solid polymer electrolyte membrane (PEM) are well-known, such electrochemical devices finding applications as, for example, fuel cells, electrolyzers, sensors, gas concentrators, gas compressors, supercapacitors, ultracapacitors and industrial electrochemical process units. A common type of solid polymer electrolyte membrane that is used in electrochemical devices consists of a homogeneous perfluorosulfonic acid (PFSA) polymer, said PFSA polymer being formed by the copolymerization of tetrafluoroethylene and perfluorovinylether sulfonic acid. Such polymers are good conductors of ions but poor conductors of electrons. See e.g., U.S. Pat. No. 3,282,875, inventors Connolly et al., issued Nov. 1, 1966; U.S. Pat. No. 4,470,889, inventors Ezzell et al., issued Sep. 11, 1984; U.S. Pat. No. 4,478,695, inventors Ezzell et al., issued Oct. 23, 1984; U.S. Pat. No. 6,492,431, inventor Cisar, issued Dec. 10, 2002, all of which are incorporated herein by reference. A commercial embodiment of a perfluorosulfonic acid polymer PEM is available from Ion Power, Inc. (New Castle, Del.) as NAFION® PFSA polymer.

Typically, the solid polymer electrolyte membrane is sandwiched between a pair of electrodes at the membrane interfaces on which desired electrochemical reactions take place, one of the electrodes functioning as an anode and the other of the electrodes functioning as a cathode. A first catalyst layer is typically positioned between the anode and the membrane, and a second catalyst layer is typically positioned between the cathode and the membrane, the catalyst layers either being formed as part of the electrodes or being applied to the solid polymer electrolyte membrane. The combination of the membrane, the catalysts and the electrodes is commonly referred to in the art as a membrane electrode assembly (MEA).

Where the electrochemical cell is used as a fuel cell to generate electricity, a fuel is supplied to the anode, and an oxidizing agent is supplied to the cathode. The electrodes are connected electrically to a load, such as an electronic circuit, by an external circuit conductor. Oxidation of the fuel at the anode produces electrons that flow through the external circuit to the cathode producing an electric current. The electrons react with an oxidant at the cathode. In theory, any substance capable of chemical oxidation that can be supplied continuously to the anode can serve as the fuel for the fuel cell, and any material that can be reduced at a sufficient rate at the cathode can serve as the oxidant for the fuel cell.

In one well-known type of fuel cell, sometimes referred to as a hydrogen fuel cell, gaseous hydrogen serves as the fuel, and gaseous oxygen serves as the oxidant. (In another well-known type of fuel cell, sometimes referred to as a direct methanol fuel cell, liquid methanol or an aqueous solution of methanol is used instead of hydrogen as the fuel.) The electrodes in a hydrogen fuel cell are typically porous to permit the gas-electrolyte junction to be as great as possible. At the anode, incoming hydrogen gas ionizes to produce hydrogen ions and electrons. Since the electrolyte is a non-electronic conductor, the electrons flow away from the anode via the external circuit, producing an electric current. At the cathode, oxygen gas, either from a pure supply or from air, reacts with hydrogen ions migrating through the electrolyte and the incoming electrons from the external circuit to produce water as a byproduct. The overall reaction that takes place in the fuel cell is the sum of the anode and cathode reactions, with part of the free energy of reaction being released directly as electrical energy and with another part of the free energy being released as heat at the fuel cell. Often, a number of fuel cells are assembled together in order to meet desired voltage and current requirements. One common type of assembly, often referred to as a bipolar stack, comprises a plurality of stacked fuel cells that are electrically connected in series in a bipolar configuration.

An electrolyzer is similar in structure to a fuel cell but functions essentially in reverse to a fuel cell. Consequently, in the case of a water electrolyzer, water and electricity are provided, and molecular hydrogen and molecular oxygen are produced. In another common type of electrolyzer, water and sulfur dioxide are provided, and sulfuric acid and hydrogen gas are produced.

Most fuel cells are run using a finite quantity of fuel, the fuel typically being withdrawn from a storage vessel as needed. For example, in the case of a hydrogen fuel cell, hydrogen gas is typically stored in and withdrawn from a hydrogen storage tank. As can be appreciated, if fuel is withdrawn from a storage vessel, and the fuel is not replenished thereafter in some manner, then eventually there will be no fuel left for the fuel cell to operate. A regenerative fuel cell system addresses this problem by including equipment that may be used to regenerate fuel for the fuel cell. For example, in the case of a hydrogen fuel cell system, the equipment for regenerating fuel may include an electrolyzer that is run to convert water into oxygen gas and hydrogen gas. The electrolyzer may be operated using solar, wind or geothermal energy so as not to deplete the electrical energy produced by operation of the fuel cell. In this manner, a regenerative fuel cell system may be used in a fashion similar to a rechargeable battery, with the electrolyzer being run to store energy and with the fuel cell being run to generate electrical current. A regenerative fuel cell system may include separate electrolyzer and fuel cell units or may include a bifunctional unit that may be alternately operated either as an electrolyzer or as a fuel cell. In those instances in which a bifunctional unit is used, the system is typically referred to as a unitized regenerative fuel cell system. Regenerative fuel cell systems may be either closed-loop, in which case the quantities of fuel, oxidant and products are limited, or open-loop, in which case the quantities are unlimited.

Additional background information relating to regenerative fuel cell systems may be found, for example, in the following patents and publications, all of which are incorporated herein by reference: U.S. Pat. No. 6,887,601 B2, inventors Moulthrop, Jr. et al., issued May 3, 2005; U.S. Pat. No. 6,838,205 B2, inventors Cisar et al., issued Jan. 4, 2005; U.S. Pat. No. 6,833,207 B2, inventors Joos et al., issued Dec. 21, 2004; U.S. Pat. No. 3,981,745, inventor Stedman, issued Sep. 21, 1976; Giner et al., "Fuel Cells As Rechargeable Batteries," *Proceedings NATO-ARW, Kiev 5/95* (Kluwer, Dordrecht, 1/96) pp. 215-232; Burke, "High Energy Density Regenerative Fuel Cell Systems for Terrestrial Applications," *IEEE AES Systems Magazine,* 23-34 (1999); and Ioroi et al., "Thin film electrocatalyst layer for unitized regenerative polymer electrolyte fuel cells," *Journal of Power Sources,* 112:583-7 (2002).

Problems that are commonly encountered in electrochemical cells of the type comprising solid polymer electrolyte membranes include the removal of products from the membrane electrode assembly or the continued supply of reactants to the membrane electrode assembly. For example, in the case of a hydrogen fuel cell, water tends to accumulate on the cathodic catalyst, where water is produced. This is problematic because the accumulated water often impedes the delivery of additional reactant gases to the catalyst. This is generally addressed by operating one or both of the feed gases at high excess stoichiometries and separating the product water. However, this approach is not always feasible, such as when the quantities of gases are limited or when the fuel cell is a dead-end fuel cell (i.e., a fuel cell having a gas inlet but no gas outlet). Also, in the case of a water electrolyzer, water is typically fed to the electrolyzer at either the oxygen or hydrogen electrode. This is typically done at a high stoichiometric ratio to cool the stack and to ensure the utilization of the entire surface area. The evolved product gas and excess water then need to be separated, often under high pressure, with recovery of the water.

In U.S. Patent Application Publication No. US 2009/0220845 A1, inventors Mittelsteadt et al., which was published Sep. 3, 2009, and which is incorporated herein by reference, there is described an electrochemical device and methods of using the same. In one embodiment, the electrochemical device may be used as a fuel cell and/or as an electrolyzer and includes a membrane electrode assembly (MEA), an anodic gas diffusion medium in contact with the anode of the MEA, a cathodic gas diffusion medium in contact with the cathode, a first bipolar plate in contact with the anodic gas diffusion medium, and a second bipolar plate in contact with the cathodic gas diffusion medium. Each of the bipolar plates comprises (1) an electrically-conductive, chemically-inert, non-porous, liquid-permeable, substantially gas-impermeable membrane in contact with its respective gas diffusion medium, the membrane being in the form of a solid polymer electrolyte into which electrically-conductive particles are dispersed; (2) a fluid chamber in contact with the membrane on the side opposite to its respective gas diffusion medium; and (3) a non-porous and electrically-conductive plate in contact with the fluid chamber on the side opposite to its respective electrically-conductive, chemically-inert, non-porous, liquid-permeable, substantially gas-impermeable membrane. The membrane of the bipolar plate on the cathode side may be used, for example, in a hydrogen fuel cell to selectively withdraw product water, but not reactant oxygen, from the cathodic gas diffusion medium, and the membrane of the bipolar plate on the anode side may be used, for example, in a water electrolyzer to feed water in vapor form to the anodic gas diffusion medium.

Unfortunately, however, the present inventors have discovered that the bipolar plate membranes of the aforementioned patent application publication have limited utility due to their poor mechanical strength, which causes the membranes to rupture easily during the assembly of cells and during repeated on/off electrolyzer cycling tests.

Other patents of interest include the following, all of which are incorporated herein by reference: U.S. Pat. No. 6,811,905 B1, inventors Cropley et al., which issued Nov. 2, 2004; U.S. Pat. No. 6,808,838 B1, inventor Wilson, which issued Oct. 26, 2004; U.S. Pat. No. 6,171,720 B1, inventors Besmann et al., which issued Jan. 9, 2001; U.S. Pat. No. 4,729,932, inventor McElroy, which issued Mar. 8, 1988; U.S. Pat. No. 4,678,724, inventor McElroy, which issued Jul. 7, 1987; U.S. Pat. No. 4,543,303, inventors Dantowitz et al., which issued Sep. 24, 1985; and U.S. Pat. No. 3,418,168, inventor Wentworth, which issued Dec. 24, 1968.

SUMMARY OF THE INVENTION

It is an object of the present invention to provide a novel electrochemical device.

It is another object of the present invention to provide an electrochemical device that overcomes at least some of the problems associated with existing electrochemical devices.

According to one aspect of the invention, there is provided an electrochemical device that comprises (a) a polymer electrolyte membrane, said polymer electrolyte membrane having opposing first and second faces; (b) an anode electrically coupled to the first face of said polymer electrolyte membrane; (c) a cathode electrically coupled to the second face of said polymer electrolyte membrane; (d) an anodic gas diffusion medium defining an anode chamber in fluid communication with said anode, said anodic gas diffusion medium having opposing first and second faces, said first face facing towards said anode; (e) a cathodic gas diffusion medium defining a cathode chamber in fluid communication with said cathode, said anodic gas diffusion medium having opposing first and second faces, said first face facing towards said cathode; and (f) a first membrane, said first membrane being in contact with said second face of said anodic gas diffusion medium, said first membrane being electrically-conductive, non-porous, and selectively-permeable and comprising a solid polymer electrolyte and a non-particulate, electrically-conductive material.

According to another aspect of the invention, there is provided an electrochemical device that comprises (a) a polymer electrolyte membrane, said polymer electrolyte membrane having opposing first and second faces; (b) an anode electrically coupled to the first face of said polymer electrolyte membrane; (c) a cathode electrically coupled to the second face of said polymer electrolyte membrane; (d) an anodic gas diffusion medium defining an anode chamber in fluid communication with said anode; (e) a cathodic gas diffusion medium defining a cathode chamber in fluid communication with said cathode; and (f) a first membrane, said first membrane being in contact with said second face of said cathodic gas diffusion medium, said first membrane being electrically-conductive, non-porous, and selectively-permeable and comprising a solid polymer electrolyte and a non-particulate, electrically-conductive material.

For purposes of the present specification and claims, it is to be understood that certain relational terms used herein, such as "on," "over," and "in front of," when used to denote the relative positions of two or more components of an electrochemical cell are used to denote such relative positions in a particular orientation and that, in a different orientation, the relationship of said components may be reversed or otherwise altered.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts:

FIG. 13($c$) is an SEM micrograph of the surface of the membrane of FIGS. 13($a$) and 13($b$) following plasma-etch removal of the polymer matrix at the surface to form a surface rich in multi-walled carbon nanotubes, as discussed in Example 4;

FIG. 15($a$) is a top-down SEM micrograph of a solution-sprayed multi-walled carbon nanotube membrane of the present invention, as discussed in Example 4;

FIGS. 15($b$) and 15($c$) are top-down SEM micrographs at high magnification of (i) a region of the membrane of FIG. 15($a$) comprising a homogeneous dispersion of multi-walled carbon nanotubes and ionomer matrix and (ii) a region of the membrane of FIG. 15($a$) comprising a large aggregate of multi-walled carbon nanotubes, respectively, as discussed in Example 4;

DETAILED DESCRIPTION OF PREFERRED EMBODIMENTS

The present invention is based, at least in part, on the discovery that the delivery of reactants to and/or the removal of products from the membrane electrode assembly of an electrochemical device may be facilitated by the placement in the device of an electrically-conductive membrane that is selectively permeable to a desired reactant or product. Such a membrane may be used, for example, in a hydrogen fuel cell to selectively withdraw product water, but not reactant oxygen, from the cathodic gas diffusion medium and may be used, for example, in a water electrolyzer to feed water in vapor form to the anodic gas diffusion medium. In addition, the present invention is also based, at least in part, on the discovery that an electrically-conductive, selectively-permeable membrane having mechanical properties that make the membrane particularly well-suited for use in an electrochemical device may be prepared by dispersing a non-particulate, electrically-conductive material, such as carbon nanotubes, carbon nanofibers, and/or metal nanowires, in a solid polymer electrolyte.

Figure 1:
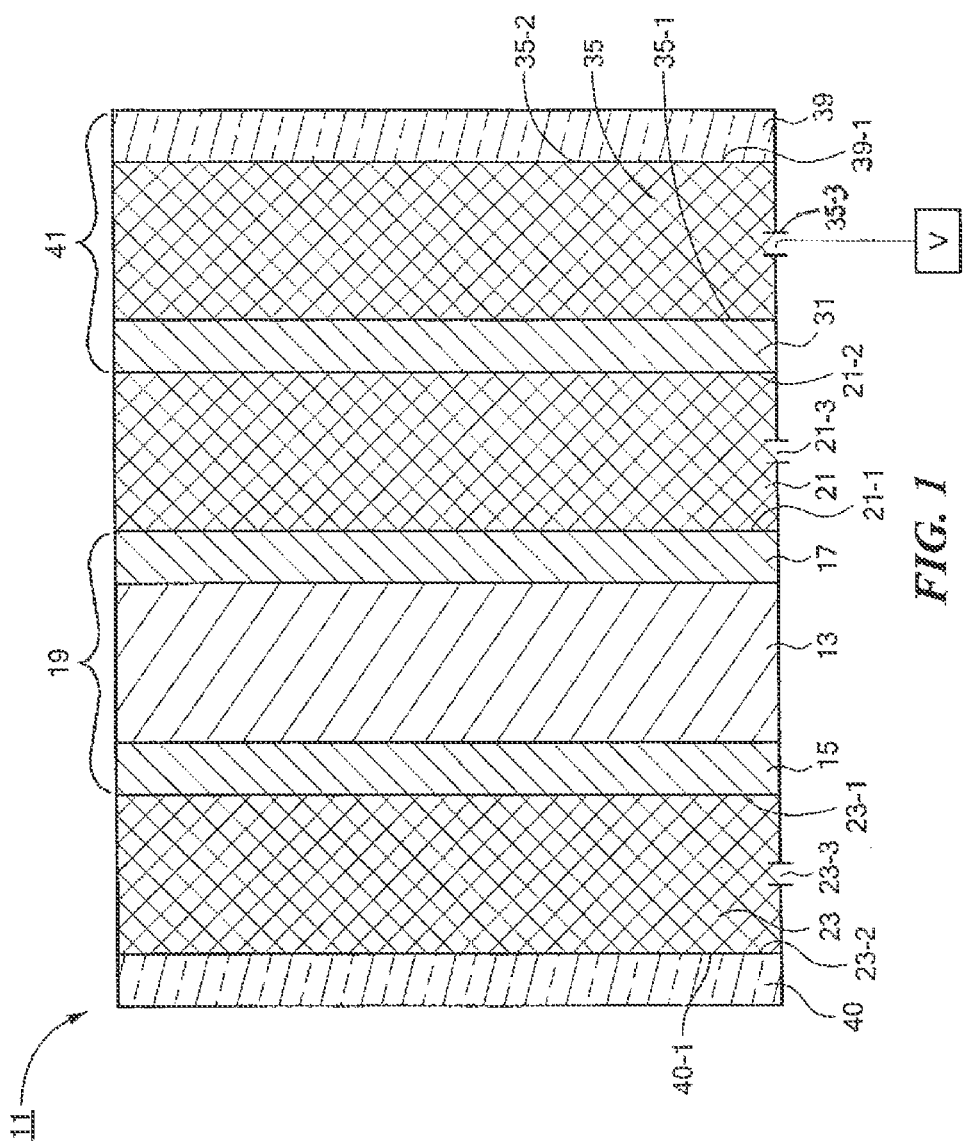
FIG. 1 is a schematic section view of a first embodiment of an electrochemical device constructed according to the teachings of the present invention.

Referring now to FIG. 1, there is schematically shown a section view of a first embodiment of an electrochemical device constructed according to the teachings of the present invention, the electrochemical device being represented generally by reference numeral 11. (For simplicity and clarity, certain standard components of electrochemical device 11, such as electrical leads, cell frames, etc., are not shown or described herein.)

Electrochemical device 11, which is particularly well-suited for use as a hydrogen fuel cell, may comprise a solid polymer electrolyte membrane 13, an anode 15 positioned in contact with and along one face of proton exchange membrane 13, and a cathode 17 positioned in contact with and along the other face of proton exchange membrane 13. A suitable catalyst (not shown) may be positioned at the interface between anode 15 and proton exchange membrane 13, and a suitable catalyst (not shown) may be positioned at the interface between cathode 17 and proton exchange membrane 13. Solid polymer electrolyte membrane 13, anode 15, and cathode 17, together with the two aforementioned catalysts, may collectively constitute a membrane electrode assembly 19. Membrane electrode assembly 19 may be conventional in structure and composition for a hydrogen fuel cell, but is not so limited.

Electrochemical device 11 may additionally comprise a pair of gas diffusion media 21 and 23, gas diffusion medium 21 having one face 21-1 in contact with cathode 17 and an opposite face 21-2 facing away from cathode 17, gas diffusion medium 23 having one face 23-1 in contact with anode 15 and an opposite face 23-2 facing away from anode 15. Gas diffusion media 21 and 23 are preferably mechanically stable, electrically-conductive, chemically-inert, porous materials. Materials suitable for use as gas diffusion media 21 and 23 may include, but are not limited to, conventional gas diffusion electrode materials, such as, but not limited to, carbon fiber papers, carbon cloths, metal meshes, metal-coated polymer meshes, perforated metal sheets and sintered metal particle sheets. Gas diffusion media 21 and 23 may be coated, partially coated or impregnated with carbon, metallic, metal oxide or polymeric substances (e.g., fibers or particles) to enhance their electrical properties and/or to modify their hydrophobicities.

Electrochemical device 11 may further include an electrically-conductive, non-porous, selectively-permeable (i.e., permeable to liquids and substantially impermeable to gases) membrane 31 in contact with and along face 21-2 of gas diffusion medium 21. Membrane 31 may comprise, for example, a solid polymer electrolyte into which non-particulate, electrically-conductive materials are dispersed. Examples of suitable materials for use as the solid polymer electrolyte include (i) polymer compositions that contain metal salts; (ii) polymeric gels that contain electrolytes; and (iii) ion exchange resins. More specifically, the solid polymer electrolyte may be, for example, a cation exchange ionomer membrane where the cation exchange group may be, but is not limited to, $-SO_3^-$, $-SO_2NH^+$, $-PO_3^{2-}$, or $-CO_2^-$ or may be, for example, an anion exchange ionomer membrane where the anion exchange group may be, but is not limited to, $-NH_2^+$. A preferred material for use as the solid polymer electrolyte is a perfluorosulfonic acid (PFSA) membrane, such as is commercially available from Ion Power, Inc. (New Castle, Del.) as NAFION® PFSA polymer. Examples of other materials that may be used in place of NAFION® PFSA are disclosed in U.S. Patent Application Publication No. US 2006/0183011 A1, inventors Mittelsteadt et al., which was published Aug. 17, 2006, and which is incorporated herein by reference.

Examples of suitable materials for use as the dispersed, non-particulate, electrically-conductive materials of membrane 31 may include high-aspect-ratio, electrically-conductive materials, such as carbon nanotubes, carbon nanofibers, metal nanowires, or combinations thereof. Without wishing to be limited to any particular theory behind the invention, it is believed that such high-aspect-ratio, electrically-conductive materials provide effective percolating networks within membrane 31 for improved electrical conductivity and mechanical properties while, at the same time, maintaining the permeability properties of the polymer matrix material.

Carbon nanotubes particularly well-suited for use in membrane 31 may have a diameter of about 0.20 nm to about 100 nm, preferably about 0.4 nm to about 80 nm, more preferably about 0.5 nm to 60 nm, and even more preferably about 0.50 nm to 50 nm. In addition, carbon nanotubes particularly well-suited for use in membrane 31 may have a length of about 0.50 μm to about 200 μm and may have an aspect ratio (i.e., length/diameter) in the range of about 5 to about 1,000,000. Additionally, carbon nanotubes particularly well-suited for use in membrane 31 may be non-functionalized or may include one or more functional groups, such as, but not limited to, $-COOH$, $-PO_4^-$, $-SO_3H$, $-SH$, $-NH_2$, tertiary amines, quaternary amines, $-CHO$, $-OH$, $-NO_2$, and $-PO_3^{2-}$. Moreover, carbon nanotubes particularly well-suited for use in membrane 31 may include single-walled carbon nanotubes, double-walled carbon nanotubes, multi-walled carbon nanotubes, or combinations thereof.

Carbon nanofibers particularly well-suited for use in membrane 31 may be non-functionalized or may include one or more functional groups, such as, but not limited to, $-COOH$, $-PO_4^-$, $-SO_3H$, $-SH$, $-NH_2$, tertiary amines, quaternary amines, $-CHO$, $-OH$, $-NO_2$, and $-PO_3^{2-}$.

In addition to including dispersed, non-particulate, electrically-conductive materials, membrane 31 may further comprise dispersed, electrically-conductive particles, such as, but not limited to, carbon black, metal particles (e.g., niobium particles, platinum particles, titanium particles, or combinations thereof), supported metal particles, or combinations thereof.

Membrane 31 may be prepared by adding the electrically-conductive materials to the ionomer while the ionomer is in suspension form and then drying the suspension.

Electrochemical device 11 may further include a fluid chamber 35. Chamber 35, which may be made of a metal screen, a carbon fiber paper or any other electrically-conductive, chemically-inert structure capable of receiving fluid and defining a cavity, has a first face 35-1 positioned in contact with and along one side 31-1 of membrane 31.

Electrochemical device 11 may further include a pair of non-porous, electrically-conductive, chemically-inert sheets 39 and 40. Sheet 39 has a first face 39-1 positioned in contact with and along a second face 35-2 of chamber 35. In this manner, sheet 39 may serve to limit the axial flow of fluid through device 11. Sheet 40 has a first face 40-1 positioned in contact with and along a second face 23-2 of gas diffusion medium 23. In this manner, sheet 40 may serve to limit the axial flow of fluid through device 11.

Membrane 31, fluid chamber 35, and sheet 39 may be regarded collectively as a bipolar plate 41.

Although only one electrochemical cell is shown in device 11, it can readily be appreciated that a plurality of like cells could be arranged in a bipolar configuration. In this case, sheet 40 may be replaced with an additional bipolar plate 41.

Where, for example, electrochemical device 11 is to be used as a fuel cell, electrochemical device 11 may be used similarly in most respects to conventional fuel cells, with oxygen gas being delivered to gas diffusion medium 21 through a port 21-3 and with hydrogen gas being delivered to diffusion medium 23 through a port 23-3. However, in contrast to conventional fuel cells, a vacuum V may be applied to fluid chamber 35 across a port 35-3. In this manner, water that is produced at cathode 17 may be drawn out of diffusion medium 21 through membrane 31 and fluid chamber 35, thereby diminishing the flooding of cathode 17 with water. (The vacuuming of water also provides some evaporative cooling to electrochemical device 11.) At the same time, because membrane 31 is substantially impermeable to gases, gas in diffusion medium 21 will not be drawn through membrane 31 and, instead, will be retained in diffusion medium 21.

Figure 2:
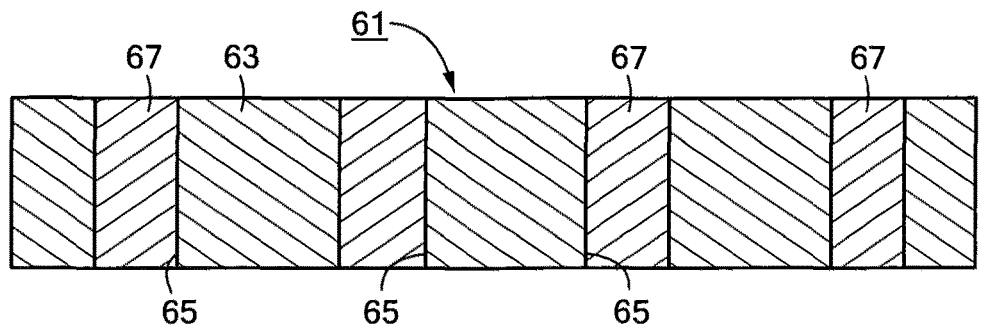
FIG. 2 is a schematic section view of a first alternate embodiment of the electrically-conductive, non-porous, selectively-permeable membrane shown in FIG. 1.

Referring now to FIG. 2, there is schematically shown a section view of a first alternate embodiment to electrically-conductive, non-porous, liquid-permeable, substantially gas-impermeable membrane 31, said first alternate embodiment being represented generally by reference numeral 61.

Membrane 61, which may be used in place of membrane 31 in electrochemical device 11, may comprise a rigid, chemically-inert support 63 having a plurality of pores 65. Support 63 may be electrically-conductive and may be a metal sheet or a metallic sinter. Pores 65 may be formed in a metal sheet by drilling, e.g., mechanically, chemically or by photoetching. Alternatively, support 63 may be a non-electrically-conductive porous polymer generated by inversion casting a solution of the polymer into a non-solvent or may be a non-electrically-conductive polymeric plate with pores formed by drilling, e.g., mechanically, chemically or by photoetching. Pores 65 may be filled with an electrically-conductive, non-porous, liquid-permeable, substantially gas-impermeable material 67, which may be identical in composition to membrane 31.

Membrane 61 may be preferred over membrane 31 in cases where one wishes to have increased mechanical strength. The number, distribution, and dimensions of pores 65 may be varied depending upon the requirements for electrochemical device 11.

Figure 3:
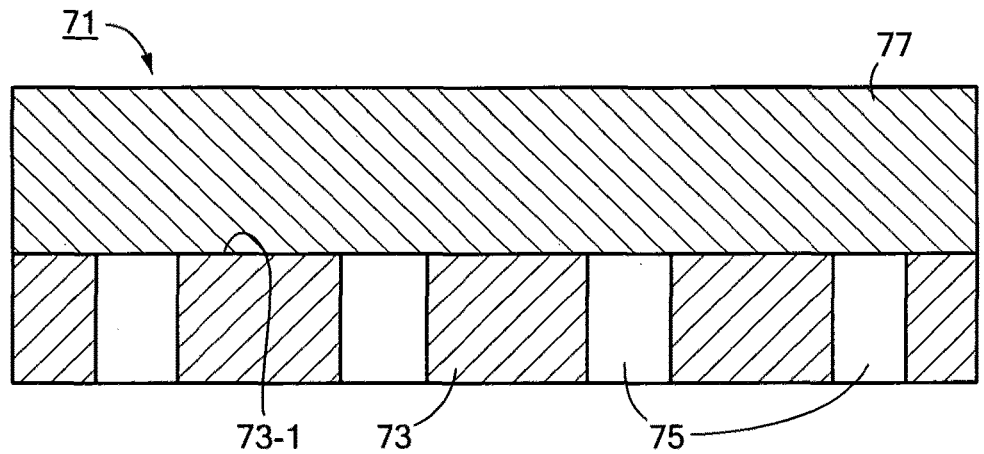
FIG. 3 is a schematic section view of a second alternate embodiment of the electrically-conductive, non-porous, selectively-permeable membrane shown in FIG. 1.

Referring now to FIG. 3, there is schematically shown a section view of a second alternate embodiment to electrically-conductive, non-porous, selectively-permeable membrane 31, said second alternate embodiment being represented generally by reference numeral 71.

Membrane 71, which may be used in place of membranes 31 and 61 in electrochemical device 11, may comprise a rigid, chemically-inert, electrically-conductive sheet 73 having a plurality of transverse pores 75. Sheet 73 may be a metal sheet. Membrane 71 may further comprise an electrically-conductive, non-porous, selectively-permeable sheet 77, which may be identical in composition to membrane 31. Sheet 77 may be positioned in contact with and along one face 73-1 of sheet 73.

Figure 4:
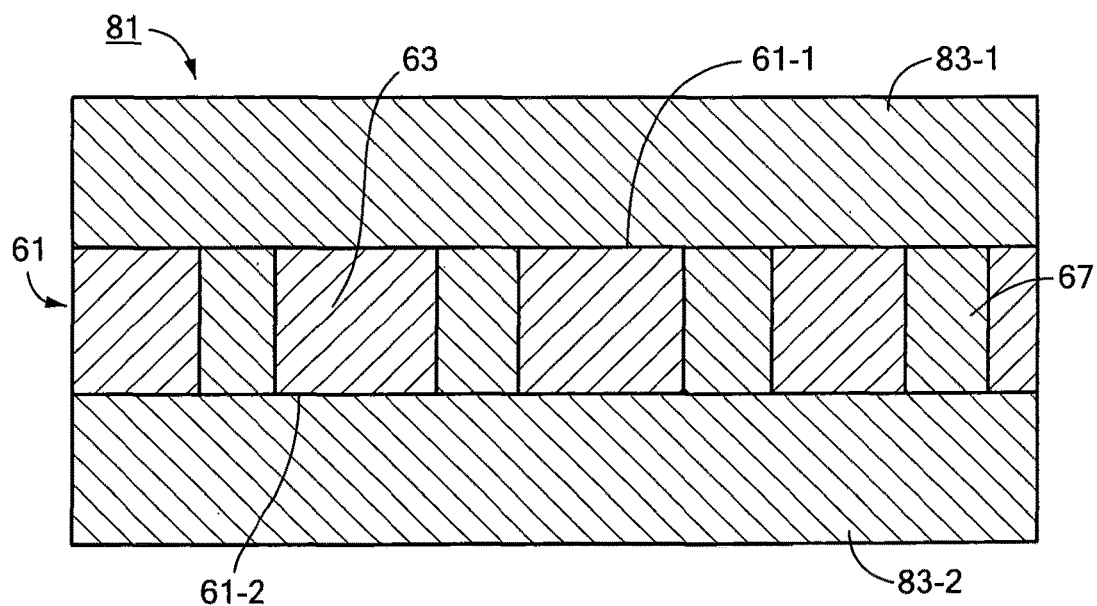
FIG. 4 is a schematic section view of a third alternate embodiment of the electrically-conductive, non-porous, selectively-permeable membrane shown in FIG. 1.

Referring now to FIG. 4, there is schematically shown a section view of a third alternate embodiment to electrically-conductive, non-porous, selectively-permeable membrane 31, said third alternate embodiment being represented generally by reference numeral 81.

Membrane 81, which may be used in place of membranes 31, 61 and 71 in electrochemical device 11, is similar in certain respects to membrane 61, the primary difference between membrane 81 and membrane 61 being that membrane 81 additionally comprises a pair of sheets 83-1 and 83-2, both of which may be identical to membrane 31, positioned in contact with and along opposite faces 61-1 and 61-2 of membrane 61. Where support 63 is electrically-conductive, one may omit, if desired, the non-particulate, electrically-conductive material from the gas-impermeable material 67 filling pores 65.

Figure 5:
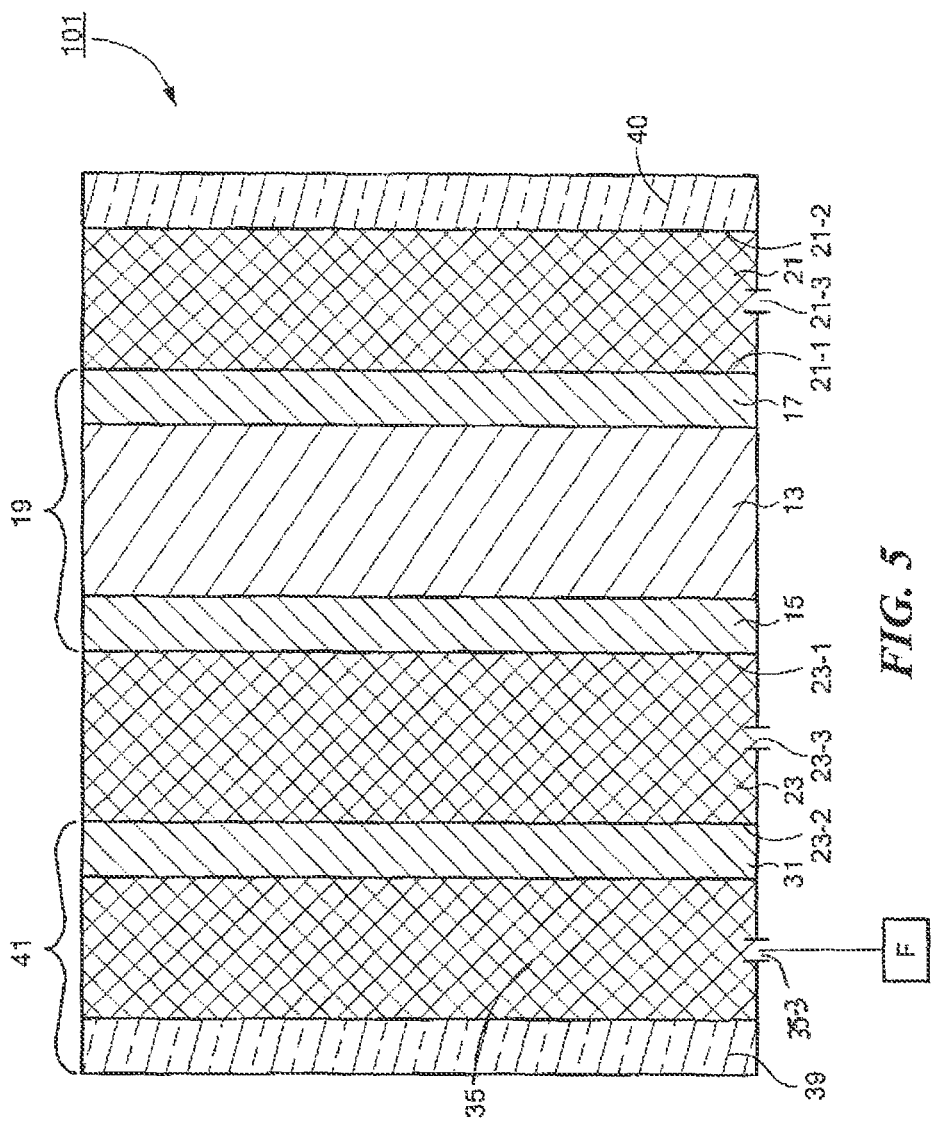
FIG. 5 is a schematic section view of a second embodiment of an electrochemical device constructed according to the teachings of the present invention.

Referring now to FIG. 5, there is schematically shown a section view of a second embodiment of an electrochemical device constructed according to the teachings of the present invention, the electrochemical device being represented generally by reference numeral 101.

Electrochemical device 101, which is particularly well-suited for use as a water electrolyzer (or as an $SO_2$ electrolyzer), may be similar in certain respects to electrochemical device 11. For example, similar to electrochemical device 11, electrochemical device 101 may comprise a membrane electrode assembly 19 that includes a polymer electrolyte membrane 13, an anode 15, and a cathode 17. In addition, similar to electrochemical device 11, electrochemical device 101 may comprise a gas diffusion medium 21 positioned in contact with and along cathode 17 and may comprise a gas diffusion medium 23 positioned in contact with and along anode 15. However, electrochemical device 101 differs primarily from electrochemical device 11 in that, in electrochemical device 101, bipolar plate 41 is positioned in contact with and along gas diffusion medium 23 (with membrane 31 facing towards gas diffusion medium 23 and sheet 39 facing away from gas diffusion medium 23), and sheet 40 is placed in contact with and along gas diffusion medium 21. In addition, electrochemical device 101 differs from electrochemical device 11 in that vacuum V of electrochemical device 11 is replaced with a water feed F in electrochemical device 101.

Although only one electrochemical cell is shown in device 101, it can readily be appreciated that a plurality of like cells could be arranged in a bipolar configuration. In this case, sheet 40 may be replaced with an additional bipolar plate 41.

Where, for example, electrochemical device 101 is to be used as a water electrolyzer, electrochemical device 101 may be used similarly in certain respects to conventional water electrolyzers, with evolved oxygen gas being removed from gas diffusion medium 21 through port 21-3 and with evolved hydrogen gas being removed from diffusion medium 23 through port 23-3. However, in contrast to conventional water electrolyzers, liquid water is inputted to fluid chamber 35 through port 35-3, said water thereafter diffusing across membrane 31 and being released to gas diffusion medium 23 in the vapor phase. (The water in chamber 35 also serves to cool electrochemical device 101.) In this manner, the amount of water that is present in gas diffusion medium 23 is capable of being regulated—primarily by a water gradient created by the consumption of water at anode 15.

As can be appreciated, because membrane 31 provides water vapor, as opposed to liquid water, to gas diffusion medium 23, the water supplied to chamber 35 may contain dissolved salts, which would otherwise need to be removed from the water if liquid water were to be supplied directly to the membrane electrode assembly 19. Consequently, if desired, water in the form of filtered seawater (filtered for large particulates) could be supplied to chamber 35.

Figure 6:
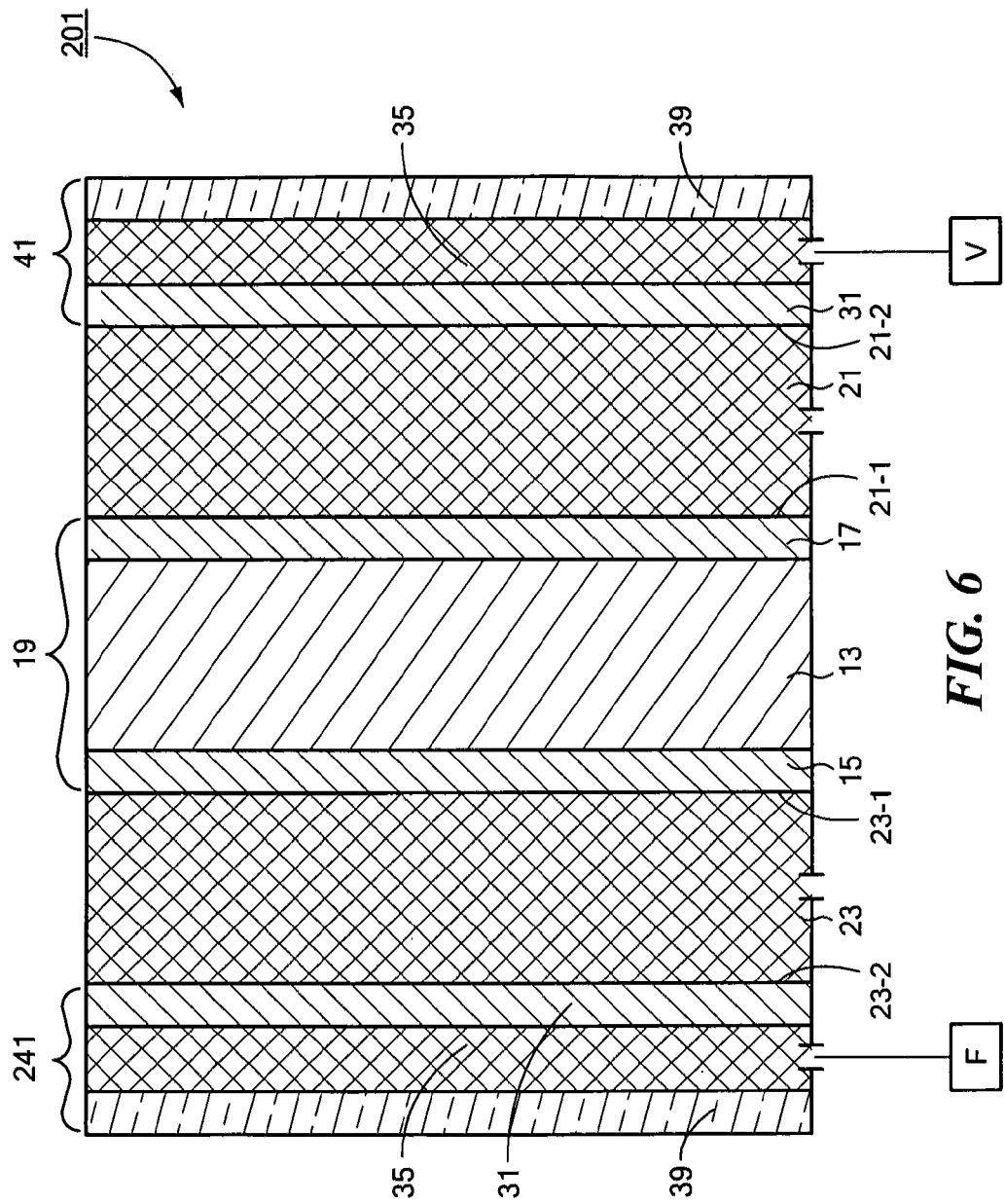
FIG. 6 is a schematic section view of a third embodiment of an electrochemical device constructed according to the teachings of the present invention.

Referring now to FIG. 6, there is schematically shown a section view of a third embodiment of an electrochemical device constructed according to the teachings of the present invention, the electrochemical device being represented generally by reference numeral 201.

Electrochemical device 201, which may be used, for example, as a unitized regenerative fuel cell or as a direct methanol fuel cell, may be similar in certain respects to electrochemical device 11. For example, similar to electrochemical device 11, electrochemical device 201 may comprise a membrane electrode assembly 19 that includes a polymer electrolyte membrane 13, an anode 15, and a cathode 17. In addition, similar to electrochemical device 11, electrochemical device 201 may comprise a gas diffusion medium 21 positioned in contact with and along cathode 17 and may comprise a gas diffusion medium 23 positioned in contact with and along anode 15. Moreover, similar to electrochemical device 11, electrochemical device 101 may include bipolar plate 41 positioned in contact with and along gas diffusion medium 21 (with membrane 31 facing towards gas diffusion medium 21 and sheet 39 facing away from gas diffusion medium 21) and a vacuum V coupled to fluid chamber 35. Electrochemical device 201 differs primarily from electrochemical device 11 in that, in electrochemical device 201, a bipolar plate 241, which is a mirror image of bipolar plate 41, is positioned in contact with and along gas diffusion medium 23 (with membrane 31 facing towards gas diffusion medium 23 and sheet 39 facing away from gas diffusion medium 23). In addition, a liquid feed F, which may be a water feed for an electrolyzer or a methanol feed for a direct methanol fuel cell, is coupled to fluid chamber 35 of bipolar plate 241.

Where electrochemical device 11 or 201 is used as a direct methanol fuel cell, the advantages over conventional direct methanol fuel cells are many. In a conventional direct methanol fuel cell, a weakly concentrated methanol solution (1 M to 3 M) is fed at the anode in excess stoichiometry. The $CO_2$ that is generated is evacuated from the cell with the excess methanol and must be separated from the methanol which is returned to the feed stock. The intimate contact with the MEA leads to large amounts of crossover of both methanol and water. Methanol crossover to the cathode is detrimental in two ways, first as a direct loss of fuel, secondly methanol at the cathode depolarizes the electrode by recombining with and removing oxygen from the catalyst surface. Water in the anode feed is also problematic as it crosses over the cathode by both diffusion and electroosmotic drag. This water can then flood the cathode catalyst, preventing oxygen from reaching the catalyst surface.

In the present invention, the methanol is fed as either a concentrated or neat methanol solution. Methanol transport then occurs through a methanol activity gradient through member 31 into the cavity of the anodic gas diffusion medium and to the anode surface. Manipulation of the composition and thickness of member 31 allows the rate of methanol crossover to be controlled to near the designed operating electrochemical consumption rate. This can greatly reduce the methanol crossover. Additionally, water can be placed in the cavity of the anodic gas diffusion medium with the methanol or in the cavity of the cathodic gas diffusion medium. The former approach, e.g., electrochemical device 11, has the advantage of cell build simplicity, with only one inner chamber. On the other hand, having water in a secondary chamber on the cathode side, e.g., electrochemical cell 201, allows neat methanol to be used as a fuel while greatly simplifying system operation in that both the methanol and water feeds could be dead-ended.

As can be seen from the above, the present invention allows for the introduction of products and/or the removal of reactants in electrochemical stacks in a planar fashion, directly at the site of the electrochemical reaction rather than utilizing a flow channel. This greatly simplifies many electrochemical stacks and systems using the same by (i) avoiding fouling of electrode catalyst surfaces by product; (ii) removing parasitic pumping losses associated with removing product from the stack; (iii) increasing reactant efficiency by limiting the amount of reactant to the electrode, thus reducing reactant loss through crossover; and (iv) allowing simpler downstream product handling by removal of unwanted species from the stack product outlet.

The present invention can greatly simplify "closed-loop" fuel cell/electrolyzer power systems as it eliminates the need for saturators and water/gas phase separation, which is particularly challenging in a zero gravity environment. In fuel cell mode, it allows for dead-ended gas feed for both $H_2$ and $O_2$, eliminating parasitic pumping losses that are generally required for water removal. Water removal by high recirculation rates also generally requires low pressure operation (high pressure gases simply cannot hold much water). An idealized unitized cell could, therefore, directly fill/use the fuel storage tanks in electrolyzer and fuel cell modes, respectively. Additionally, it eliminates the most difficult challenge of unitized systems, water management, while allowing the weight and volume savings of an entire second stack. Finally, as the electrolyzer is fed only water vapor, the requirements for water purity are relieved, and the MEA is protected from possible contaminants. This is particularly important when the feed for a water-fed electrolyzer contains ionic constituents, such as in salt-water applications for electrolysis.

Figure 7:
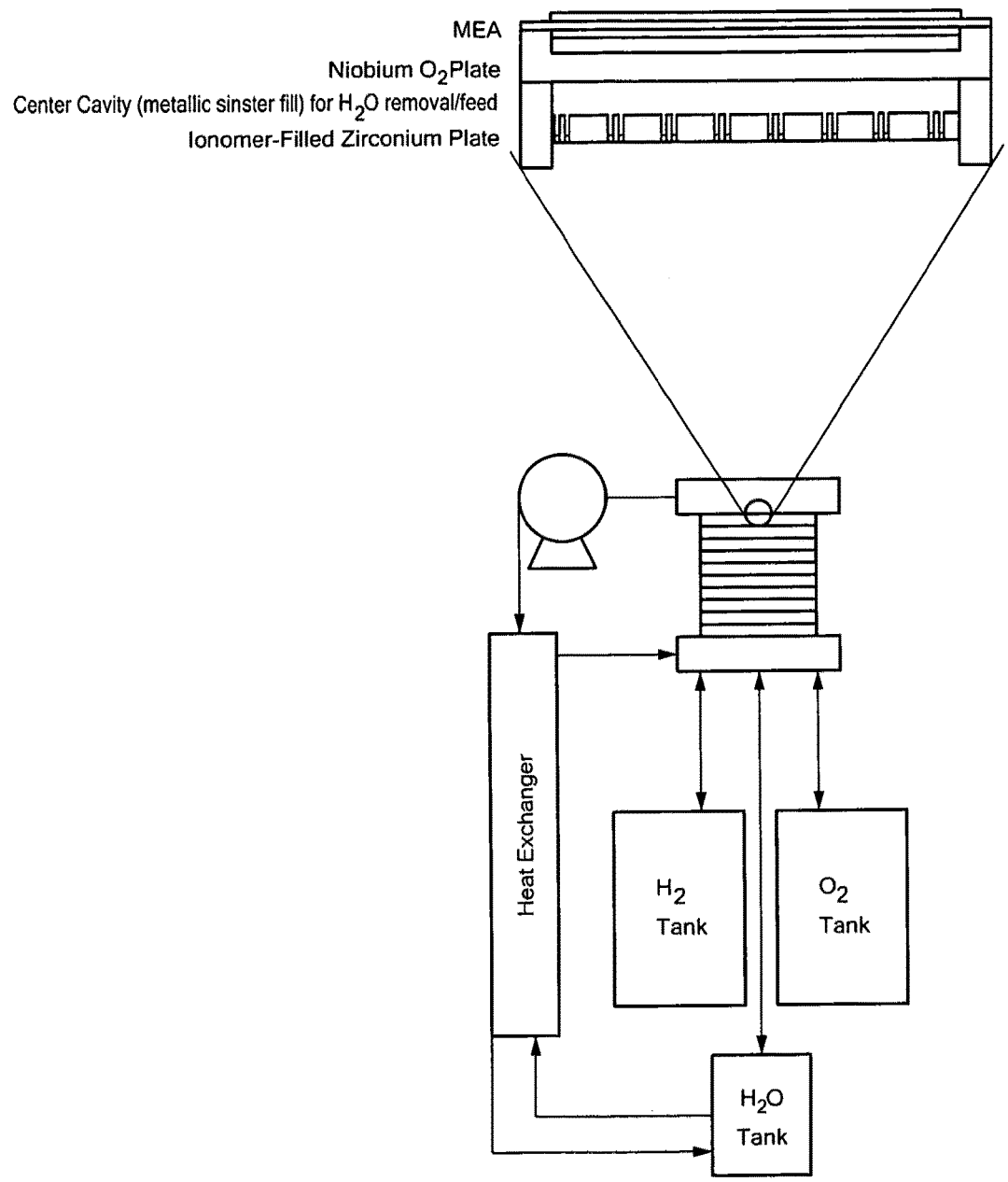
FIG. 7 is a schematic view of a unitized regenerative system that includes one embodiment of a bipolar plate constructed according to the teachings of the present invention.

The present invention provides a substantial system improvement compared to present alkaline systems, such as the space shuttle discrete alkaline fuel cell or systems that similarly control relative humidity by using porous bipolar plates, in that the present invention allows for simple high pressure operation with a high differential pressure. FIG. 7 shows a unitized regenerative system that includes the present invention.

The application of polymer electrolyte membrane fuel cells (PEMFC) that operate on pure $H_2/O_2$ reactants in closed systems is limited due to the difficulties in removing product water. Generally, it is necessary to flow one of the feed gases at great stoichiometric excess to remove product water from the flow channels, especially in high pressure $H_2/O_2$ systems where stoichiometric feed rates result in very low nominal flow velocities. Even when the water is removed with excess fuel, in a closed system, it is necessary to remove the liquid water from the excess feed before recycling the gases. The requisite pumping is a parasitic loss on the system efficiency and the liquid/gas separation is further complicated in a zero gravity environment, one of the key applications for PEMFC systems that operate on pure $O_2$. An $H_2/O_2$ PEMFC system that could operate with both reactant gases dead-ended and would not require gas/liquid separation would greatly enhance system efficiency and simplicity. A specific goal of the present invention is operation in a dead-ended $H_2/O_2$ fuel cell stack by removing water generated by the fuel cell reaction. That water is drawn through the selectively permeable membrane by vacuuming the inner chamber and maintaining a water vapor pressure below the dew point of the operating temperature of the MEA, thereby providing the necessary activity gradient.

In a conventional water electrolysis unit, distilled or deionized water is typically introduced into the anode cavity of an electrolysis cell where it is oxidized to oxygen with the concomitant production of protons. The protons are electrochemically transported across the electrolyte membrane, carrying three to four molecules of water per proton. This requires an elaborate water recovery and management system, which includes pumps, gas/water separators, filters, controls and container vessels. By bringing in the water in the vapor form, no liquid water is in the product streams. Additionally, as the liquid water feed is through the cavity and does not come into contact with the membrane electrode assembly, the purity requirement for the water is much lessened, allowing the direct use of tap or even seawater for electrolysis feed.

Figure 8:
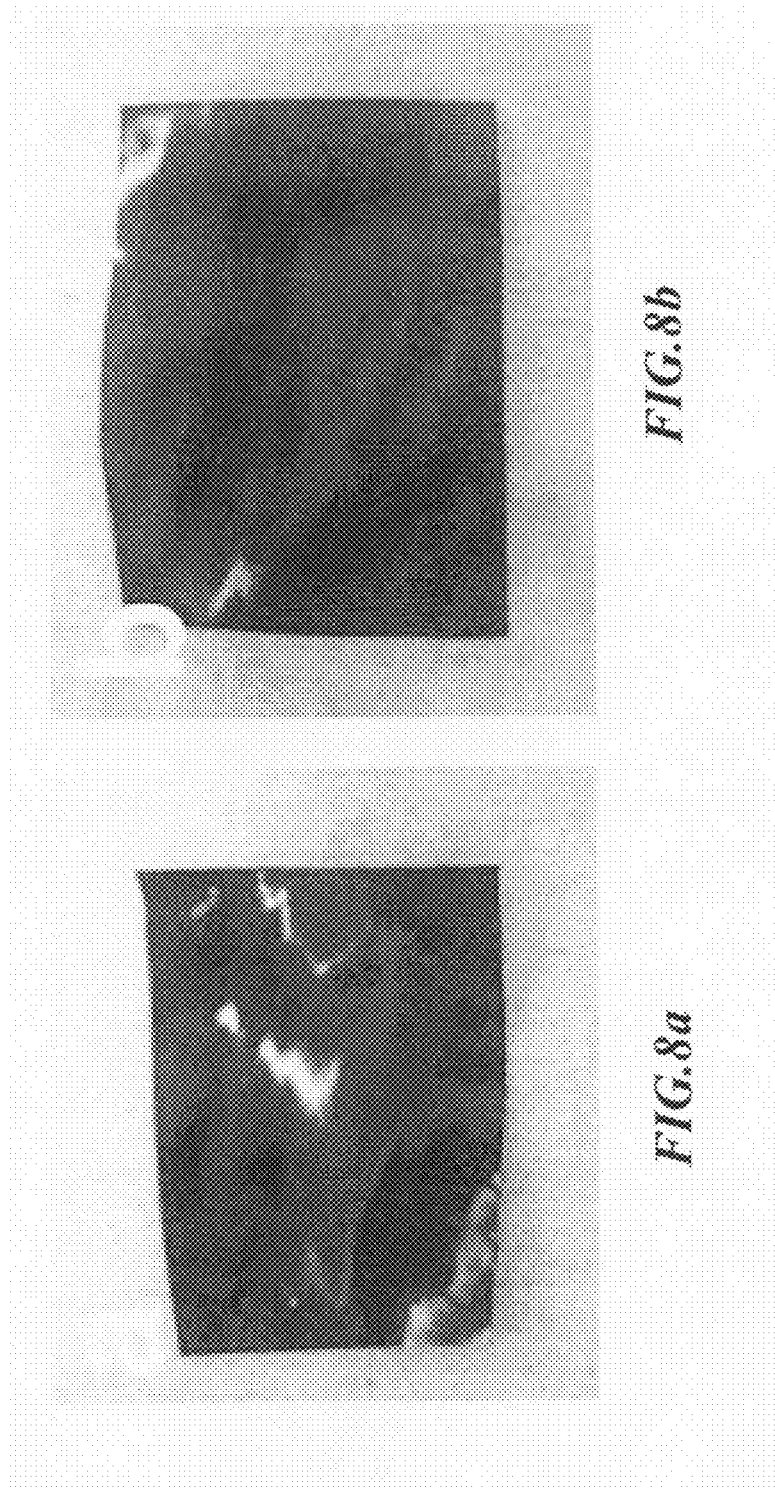
FIGS. 8($a$) and 8($b$) are images of representative electrically-conductive, non-porous, selectively-permeable membranes of the present invention prepared with (a) 5 wt % multi-walled carbon nanotubes, and (b) 10 wt % multi-walled carbon nanotubes, respectively, as discussed in Example 1.

HHT with bare surface, PR-24-XT-HHT-OX with oxygen rich surface, Pyrograf Products, Inc., Cedarville, Ohio) in concentrated dispersions of perfluorosulfonic acid polymer (PFSA) to yield dark viscous inks that were coated onto KAPTON® polyimide (DuPont, Wilmington, Del.) substrates with a wire-wound coating rod and then heat pressed to produce WaMM films as shown in FIGS. 8(a) and 8(b). Two types of PFSA dispersions were used, namely, AQUIVION™ PFSA from Solvay Solexis (Houston, Tex.) (product ID: D83-15, 830 equivalent weight) and NAFION® PFSA from Ion Power, Inc. (New Castle, Del.) (product ID: DE2021, 1100 equivalent weight). Because some of the first-prepared WaMMs contained aggregated conductive particles on the surface that could potentially serve as defect sites during electrolyzer testing, later-prepared WaMMs were made by filtering the inks through a 2.0 µm polytetrafluoroethylene (PTFE) filter prior to solvent casting. This modification resulted in WaMMs that were homogeneous and free of surface defects. Analogous WaMMs filled with carbon black particles were also prepared as control samples. Two types of carbon blacks were used for these samples, namely, VULCAN XC-72 carbon black particles from Cabot Corporation (Boston, Mass.) and CONDUCTEX SC ULTRA carbon black particles from Columbian Chemicals Company (Marietta, Ga.). In general, the process described here provided a straightforward procedure for making conductive WaMMs filled with either MWCNTs or CNFs. By contrast, WaMMs made with carbon black fillers were difficult to process because they easily cracked when the films dried after the casting procedure. In all, 19 different WaMM formulations were prepared and tested as shown in Table 1.

TABLE 1

| WaMM Description | Carbon Loading | | | | | | |
|---|---|---|---|---|---|---|---|
|  | 5 wt % | 10 wt % | 20 wt % | 25 wt % | 30 wt % | 35 wt % | 40 wt % |
| Carbon Nanotubes (MWCNTs) | | | | | | | |
| MWCNT-WaMMs (1100 EW PFSA) | X | X | X | X | X | | |
| MWCNT-WaMMs (830 EW PFSA) | | | X | X | X | X | X |
| Carbon Nanofibers (CNF and CNF-OX) | | | | | | | |
| CNF-WaMMs (1100 EW PFSA) | X | X | X | | | | |
| CNF-OX WaMMs (1100 EW PFSA) | | X | X | X | | | |
| Carbon Particles | | | | | | | |
| Vulcan-WaMMs (1100 PFSA) | | | | | X | | |
| Conductex SC Ultra-WaMMs (1100 PFSA) | X | | X | | | | |

The following examples are provided for illustrative purposes only and are in no way intended to limit the scope of the present invention:

Example 1

Preparation of Water-Management Membranes (WaMMs)

Electrically-conductive membranes, hereinafter referred to sometimes as "Water-Management Membranes" (WaMMs), were prepared, in one embodiment, by ball-milling electrically-conductive fillers consisting of multi-walled carbon nanotubes (MWCNTs) (product ID: 1292YJ, Nanostructured & Amorphous Materials, Inc., Houston, Tex.) or carbon nanofibers (CNF) (product ID: PR-24-XT- Example 2

Through-Plane Electrical Conductivity

Figure 9:
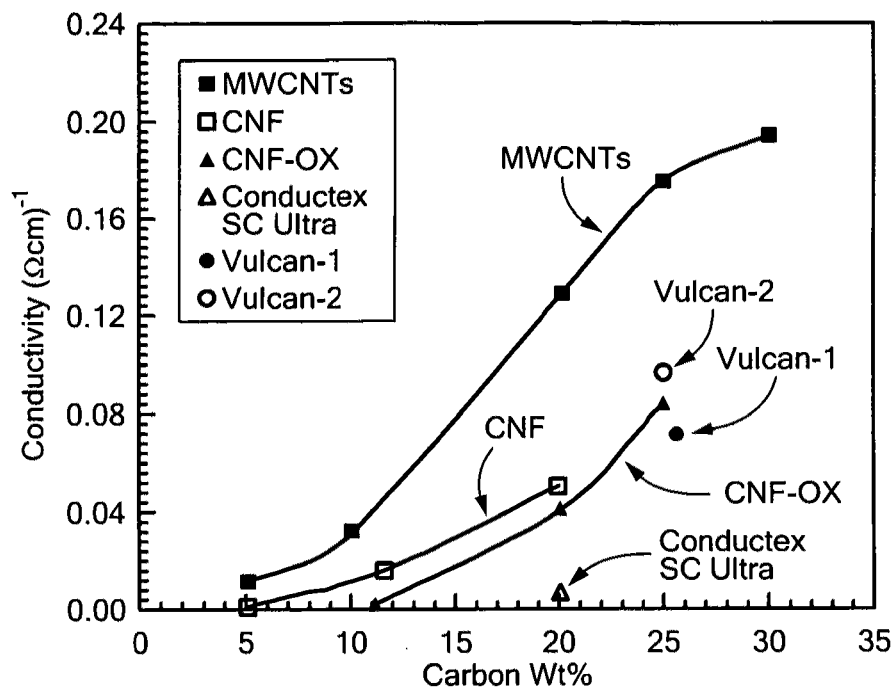
FIG. 9 is a graph depicting the through-plane conductivities of various types of electrically-conductive, non-porous, selectively-permeable membranes comprising different electrically-conductive filler materials as a function of carbon loading wt %, as discussed in Example 2.

The through-plane electrical conductivity of the WaMMs prepared in Example 1 was measured with a dynamic mechanical analyzer. The dynamic mechanical analyzer maintained constant compression on a sample while the whole probe assembly was submerged in a temperature-controlled water bath. Electrical conductivity measurements were performed in water to simulate the conditions that would be encountered by the WaMMs during electrolyzer operation. FIG. 9 shows conductivity measurements for composite WaMMs prepared with 1100 EW PFSA and using various different types of filler materials after submerging in water at temperatures of T~30° C. to 95° C. and cooled to room temperature. As can be seen, the electrical conductivity of MWCNT-WaMMs increased with MWCNT loading from 5 wt % to 30 wt %. In general, polymer composites embedded with conductive fillers become electrically conductive when the filler concentration exceeds a critical value known as the percolation threshold. This value is characterized by a significant increase in the material's electrical conductivity because the fillers form a three-dimensional, percolating pathway that acts as a current carrier through the material. It is estimated that the percolation threshold for MWCNT-WaMMs is approximately 5 wt % based on the observed sharp increase in film conductivity beyond this value.

Because the percolation threshold of conductive fillers in composites is dictated by physical characteristics, such as intrinsic conductivity, aspect ratio, and dispersion in the polymer matrix, composite WaMMs prepared with carbon nanofiber fillers were also investigated. The carbon nanofibers used were selected for their highly graphitic structure, nanoscale-size dimensions (d~100 nm), and high aspect ratio (L/d~500-2000). Additionally, carbon nanofibers with oxygen-rich surface functional groups (CNF-OX) were also investigated as it was hypothesized that such functional groups would provide a way to enhance interactions between the PFSA matrix and the nanofiber filler and would offer some improvement in the electrical conductivity of the WaMMs. However, CNF-filled WaMMs were not found to provide an improvement in electrical conductivity over MWCNT-WaMMs, regardless of the surface-chemistry of the CNF fillers. The through-plane conductivity of carbon black-filled WaMMs was lower than WaMMs filled with MWCNTs at a comparable wt % loading.

Figure 10:
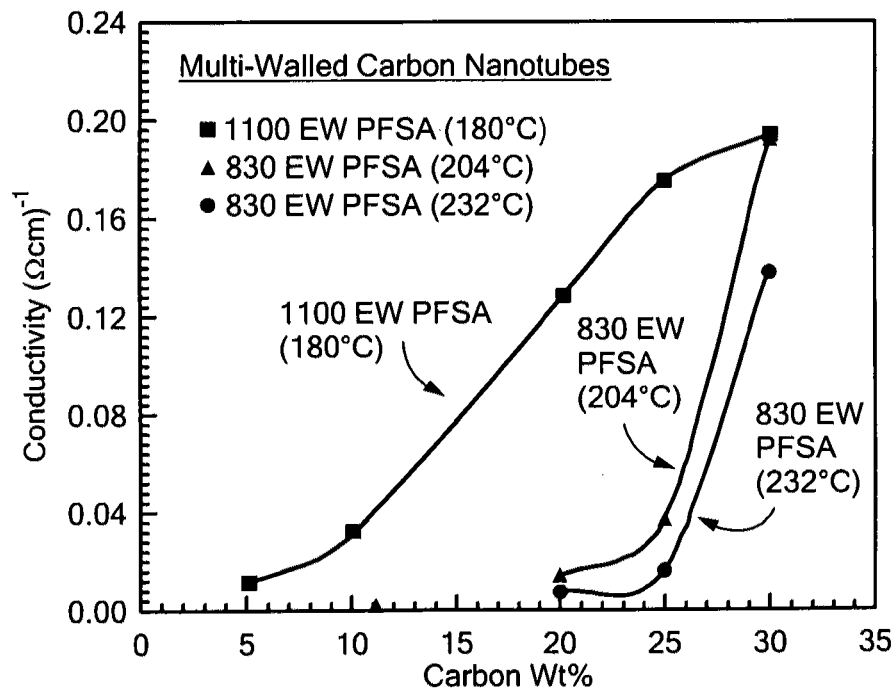
FIG. 10 is a graph depicting the through-plane conductivities of various types of electrically-conductive, non-porous, selectively-permeable membranes comprising different polymer matrix materials as a function of carbon loading wt %, as discussed in Example 2.

In order to optimize water transport properties, MWCNT-WaMMs with an 830 EW PFSA polymer were also prepared. This polymer has a higher glass transition temperature than 1100 EW PFSA; therefore, WaMMs cast with this polymer were pressed at higher temperatures (~204° C. or ~232° C.) as compared to WaMMs made with the 1100 EW PFSA (~180° C.). FIG. 10 shows that the MWCNT percolation value was approximately four times higher for the 830 EW WaMMs (~20 wt %) than for the 1100 EW WaMMs (~5 wt %). The 830 EW WaMMs were less conductive than the 1100 EW WaMMs, with the exception of samples filled with 30 wt % MWCNTs, which showed conductivity values that were comparable to 1100 EW WaMMs with 30 wt % MWCNT loading.

Example 3

In-Plane Electrical Conductivity

Figure 11:
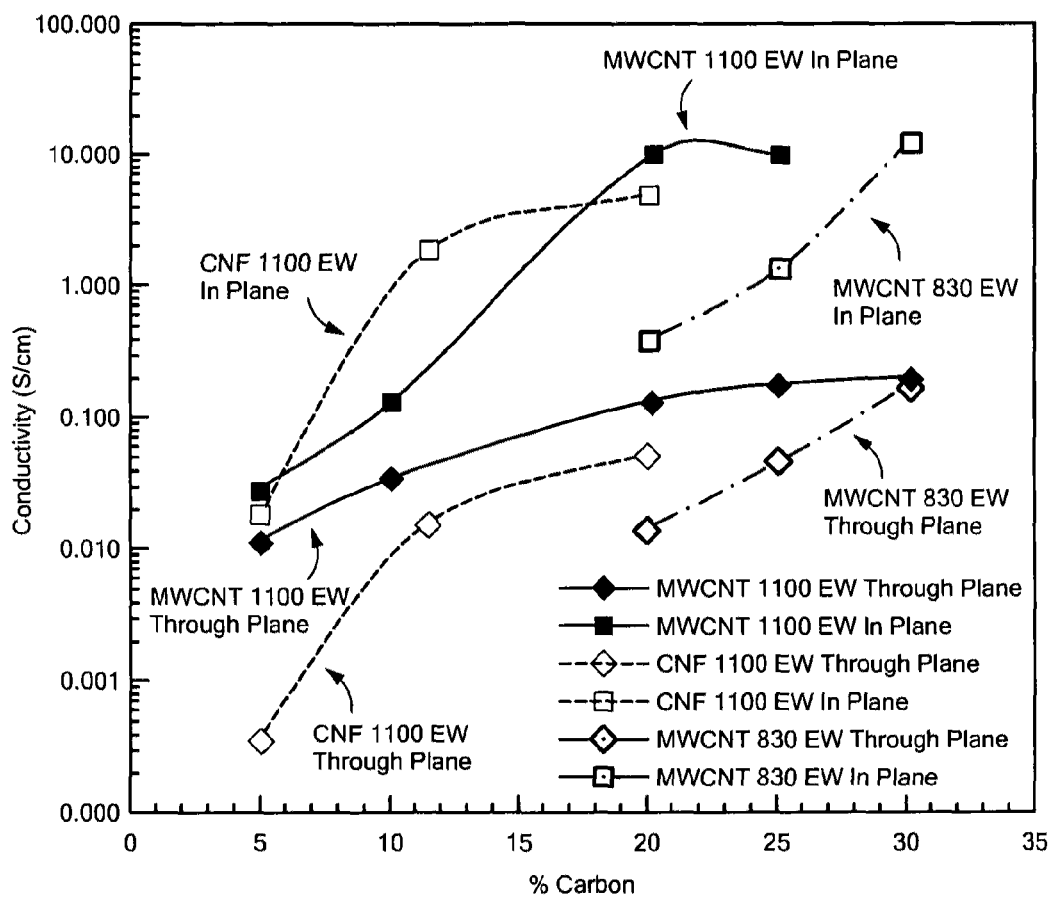
FIG. 11 is a graph depicting the in-plane and through-plane conductivities of various types of electrically-conductive, non-porous, selectively-permeable membranes as a function of carbon loading wt %, as discussed in Example 3.
Figure 12:
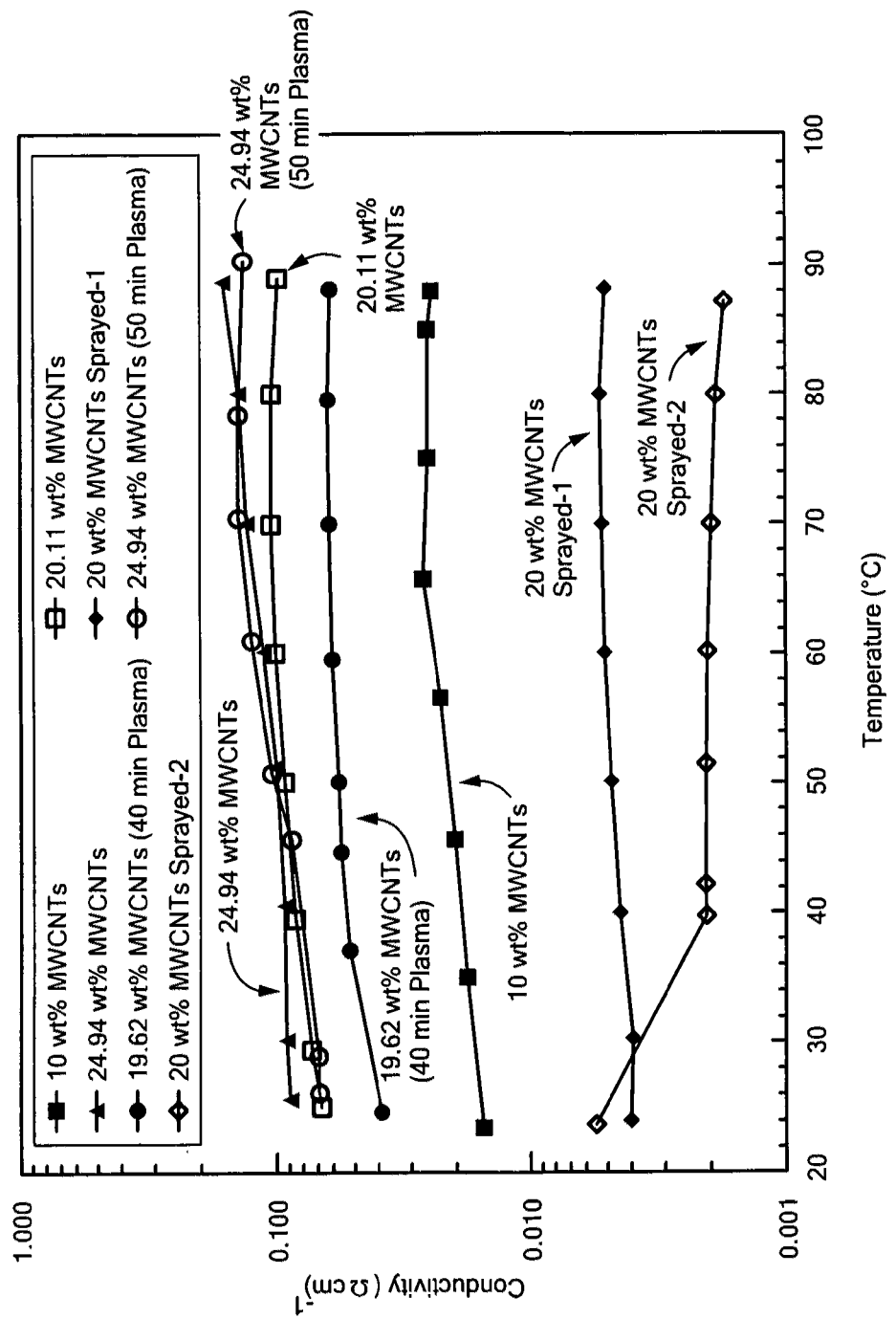
FIG. 12 is a graph depicting the volume conductivities of various solvent-cast, solution-sprayed, and plasma-etched membranes of the present invention comprising multi-walled carbon nanotubes (the sample designated "sprayed-2" having been made with one carbon-rich side (~70 wt % multi-walled carbon nanotubes)), as discussed in Example 3.

The in-plane conductivity of samples prepared in Example 1 was also measured. As can be seen in FIG. 11, the in-plane conductivity of CNF and MWCNT-filled WaMMs was consistently higher than the through-plane conductivity for WaMMs with identical filler loading wt %. For MWCNT-WaMMs, this effect was more pronounced at high MWCNT loadings (~20 wt % or higher) where a seventy five-fold increase was measured for in-plane conductivity relative to the through-plane conductivity. This was surprising and suggested that these results could possibly be an artifact of the WaMM preparation procedure. One requirement for these composite WaMMs to effectively conduct through the film thickness is accessibility of MWCNT networks at the film's surface. Therefore, to ensure that the conductivity of the composite films was not diminished by the surface-coverage of electrically-conducting MWCNTs networks by the insulating polymer matrix, formulations of composite WaMMs as sprayed films, rather than as solvent-cast films, were investigated. In this approach, two different films were prepared, one film being sprayed in one application from a single spraying solution and the other film being prepared by a two-step process in which a secondary layer was sprayed onto an initial pre-formed carbon-rich layer (~70 wt % MWCNTs). In both films, the overall MWCNT loading was kept at 20 wt %. As a second approach, the MWCNT-WaMMs were exposed to plasma gas to etch the polymer matrix from the film surface. As can be seen in FIG. 12, volume conductivity measurements of the sprayed films after hot-press molding showed a significant decrease in electrical conductivity compared to solvent-cast MWCNT-WaMMs. By comparison, the plasma etch process did not have any impact on the material's electrical conductivity.

Example 4

SEM Characterization of WaMMs

Figure 13A:
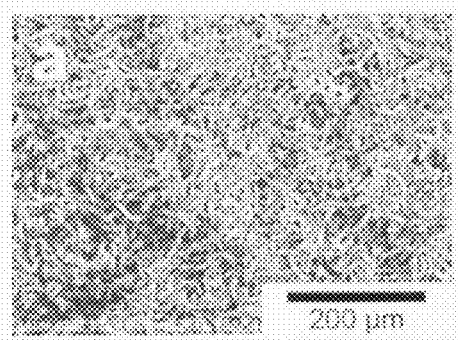
FIGS. 13($a$) and 13($b$) are SEM micrographs of a surface of a membrane of the present invention comprising multi-walled carbon nanotubes (a) at low magnification and (b) at high magnification, respectively, as discussed in Example 4.
Figure 13B:
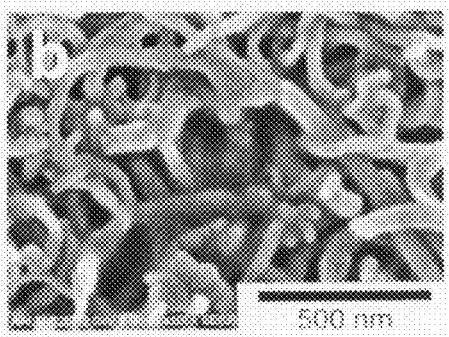
Figure 13C:
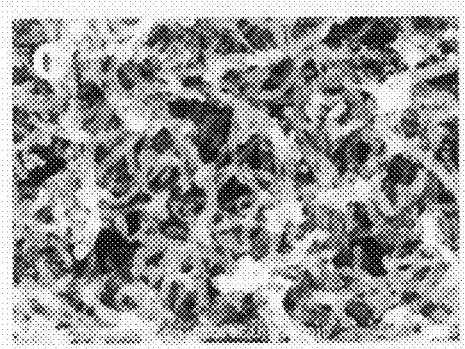
Figure 14A:
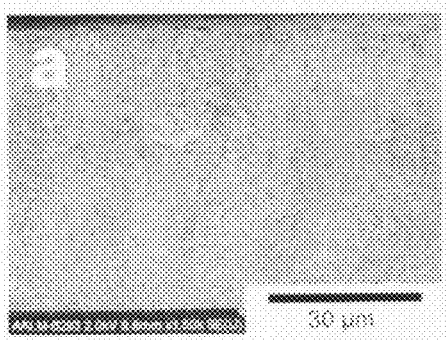
FIGS. 14($a$) through 14($c$) are cross-sectional SEM micrographs of a solvent-cast 25 wt % multi-walled carbon nanotube membrane of the present invention (a) at low magnification, (b) at intermediate magnification, and (c) at high magnification, respectively, as discussed in Example 4.
Figure 14B:
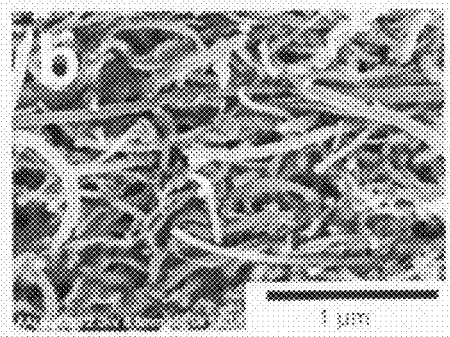
Figure 14C:
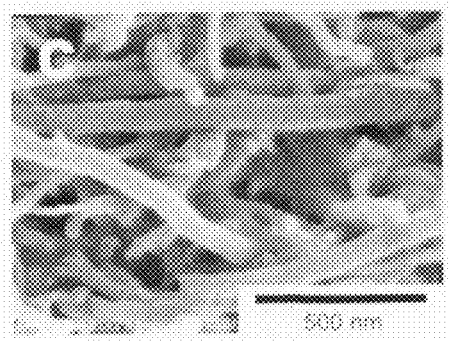

WaMMs were characterized by scanning electron microscopy (SEM) to gain a better understanding of the relationship between the dispersion of carbon nanotubes in the polymer matrix and the conductivity of the membrane. SEM analysis of the surface (FIGS. 13(a) and 13(b)) and of cross-sections (FIGS. 14(a) through 14(c)) of solvent-cast WaMMs showed a homogeneous distribution of MWCNTs within the PFSA matrix. By contrast, solution-sprayed WaMMs contained large aggregates of MWCNT bundles that negatively impacted the material's conductivity (FIGS. 15(a) through 15(c)). Additionally, the plasma etch removal of PFSA polymer to form a MWCNT-rich surface (FIG. 13(c)), did not support the hypothesis that WaMM conductivity was limited by surface-shielding of nanotubes by a polymer layer because these samples did not show an improvement in through-plane conductivity (FIG. 12). Based on cross sectional SEM images (FIG. 14(a) through 14(c)), it was concluded that the anisotropic electrical conductivity was caused by alignment of MWCNTs and CNF along the film sheet direction during the sample fabrication process (i.e., solvent-casting and/or heat pressing steps).

Example 5

Characterization of WaMM Mechanical Properties

Figure 16:
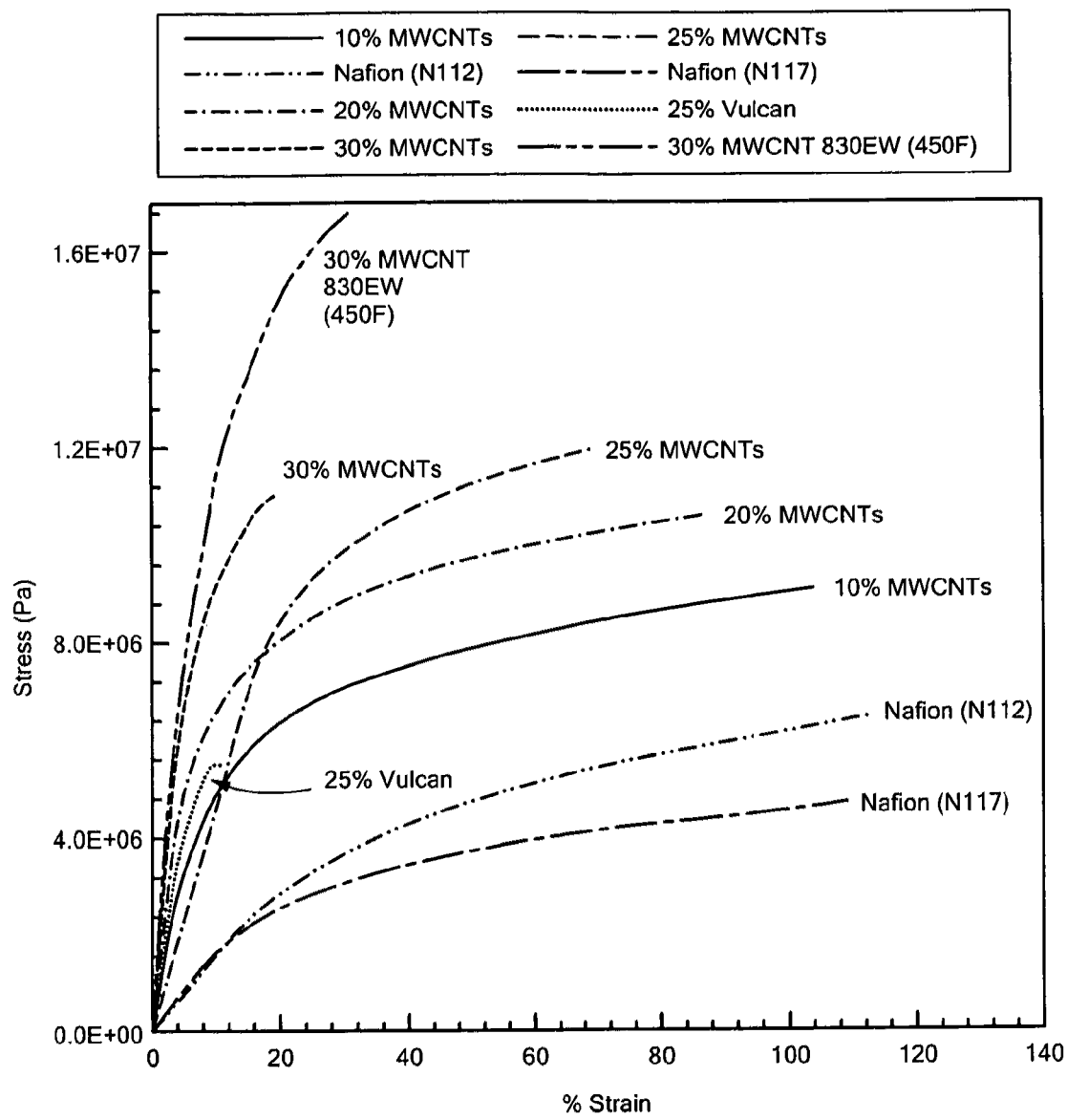
FIG. 16 is a graph depicting tensile stress-strain curves for various membranes prepared with multi-walled carbon nanotubes and 1100 EW PFSA, as well as tensile stress-strain curves for various comparative types of membranes, as discussed in Example 5.
Figure 17:
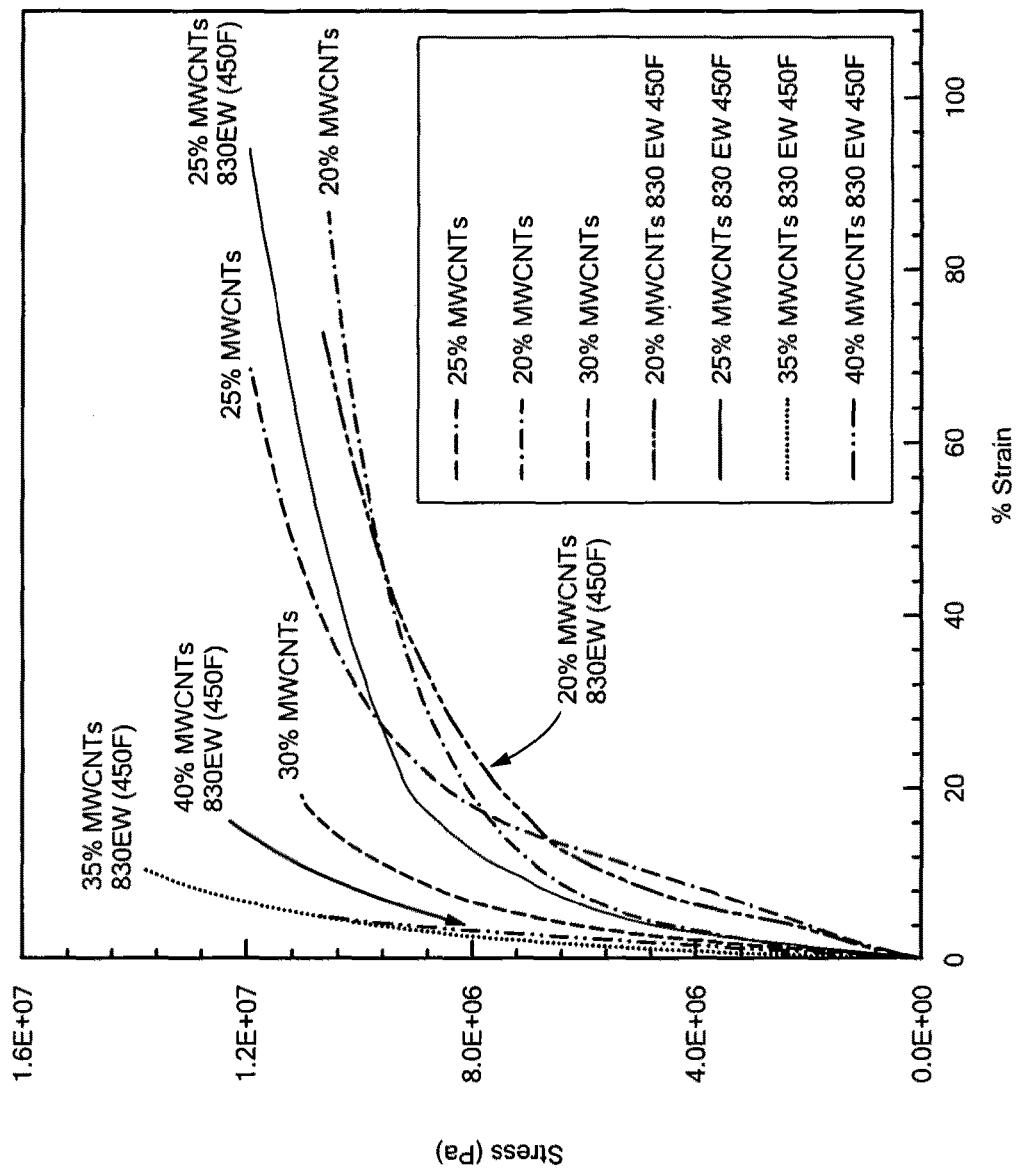
FIG. 17 is a graph depicting tensile stress-strain curves for various membranes prepared with multi-walled carbon nanotubes and either 1100 EW PFSA or 830 EW PFSA, as discussed in Example 5.
Figure 18:
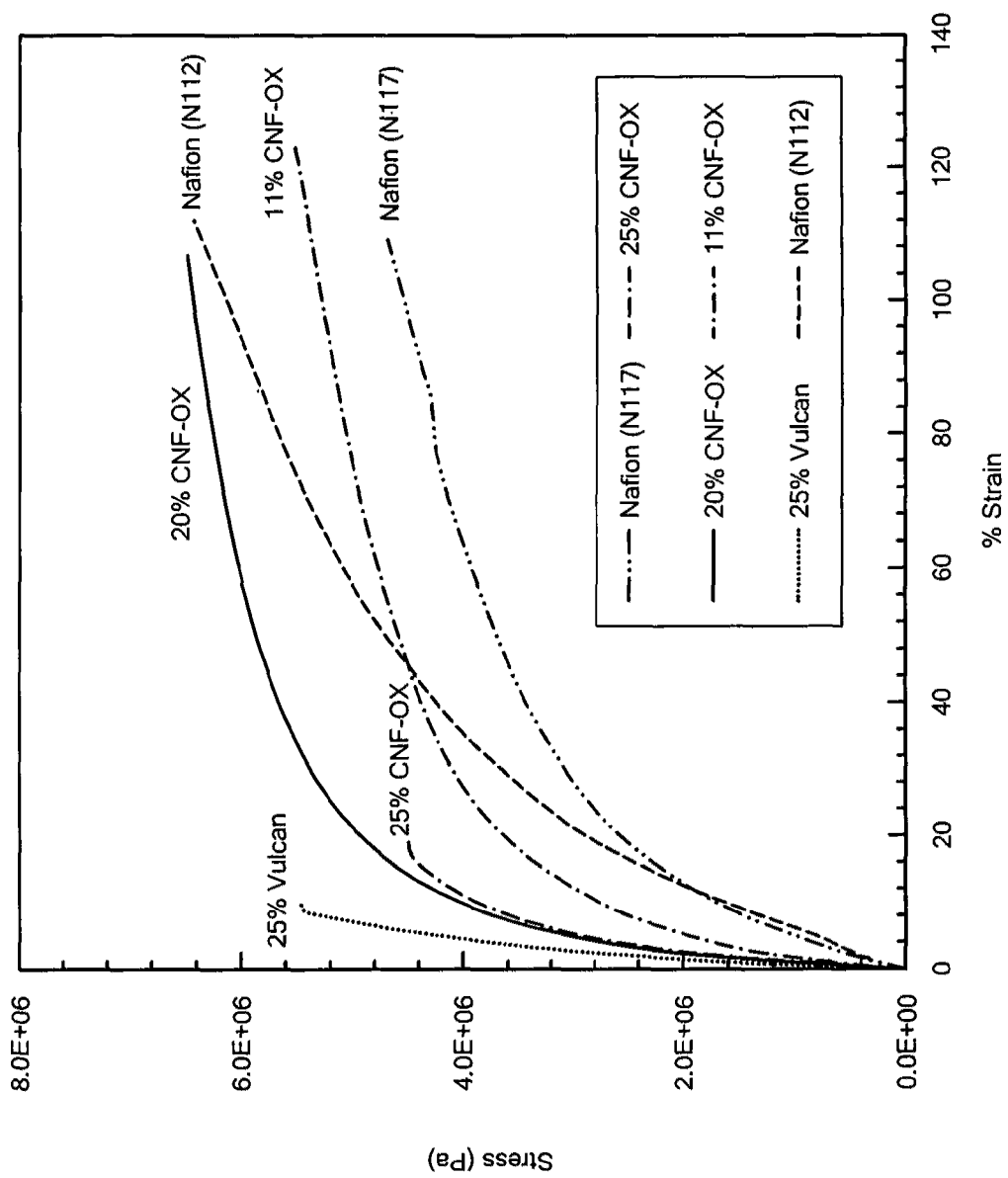
FIG. 18 is a graph depicting the tensile stress-strain curves for various membranes prepared with functionalized multi-walled carbon nanotubes, as well as tensile stress-strain curves for various comparative types of membranes.

In the membranes of the present invention, the use of carbon nanotubes is important not only for realizing higher electrical conductivity but also for improving the mechanical properties of the composite WaMMs. The mechanical properties (modulus, tensile strength, % elongation at break, toughness at break) of composite WaMMs that were tested are shown below in Table 2 and in FIGS. 16 and 17. As can be seen, in general, the modulus and tensile strength of composite WaMMs increased with carbon loading. For example, stress-strain curves showed a modulus increase of ~400% (relative to N117) and ~500% (relative to N112) for WaMMs filled with 20 wt % multi-walled nanotubes. The optimal MWCNT loading was determined to be 20-25 wt %, within which the WaMMs showed an increase in modulus values without a significant decrease in material toughness and flexibility. It was also found that switching the ionomer matrix from 1100 EW PFSA to 830 EW PFSA to achieve higher water diffusion properties did not negatively impact the mechanical properties of the WaMMs. FIG. 17 shows that the mechanical properties of MWCNT-WaMMs prepared from 830 EW PFSA were comparable to MWCNT-WaMMs made from 1100 EW PFSA. These results suggest that the composite fabrication process produced well-dispersed MWCNTs with favorable interfacial interactions with the ionomer matrix in order to strengthen the composite WaMMs. These results are a significant improvement over the highly brittle VULCAN carbon black-WaMMs, which failed at extremely low strains (~10%). Beyond a 25 wt % MWCNT loading, the WaMMs experienced a significant decrease in toughness and flexibility, which would be detrimental to the material's mechanical durability during operation in electrochemical devices. FIG. 18 shows tensile stress-strain curves for CNF-OX-WaMMs prepared with 1100 EW PFSA. Stress-strain curves for NAFION®-112, NAFION®-117, and 25 wt % VULCAN carbon black-WaMM are provided for comparison.

TABLE 2

| Sample | Modulus (MPa)[a] | Tensile Strength (MPa) | % Elongation at Break | Toughness at Break (MPa) |
|---|---|---|---|---|
| 1100 EW PFSA | | | | |
| 10 wt % MWCNTs | 69.8 | — | — | — |
| 20 wt % MWCNTs | 102.1 | 10.6 | 89.0 | 7.9 |
| 25 wt % MWCNTs | 48.8 | 11.9 | 69.1 | 6.2 |
| 30 wt % MWCNTs | 141.0 | 9.5 | 17.9 | 1.5 |
| 830 EW PFSA Pressed at 450° F. | | | | |
| 20 wt % MWCNTs | 48.7 | 10.5 | 75.9 | 5.8 |
| 25 wt % MWCNTs | 55.3 | 11.4 | 91.5 | 8.4 |
| 30 wt % MWCNTs | 155.0 | 16.9 | 31.3 | 3.9 |
| 35 wt % MWCNTs | 213.7 | 13.9 | 10.8 | 1.1 |
| 40 wt % MWCNTs | 210.7 | 10.7 | 5.0 | 0.3 |
| Reference Samples | | | | |
| 25 wt % Vulcan | 83.4 | 5.5 | 10.2 | 0.4 |
| Nafion (N112) | 15.9 | — | — | — |
| Nafion (N117) | 19.5 | — | — | — |

[a]Modulus determined at 5% strain

Example 6

Characterization of WaMM Dimensional Stability

Figure 19:
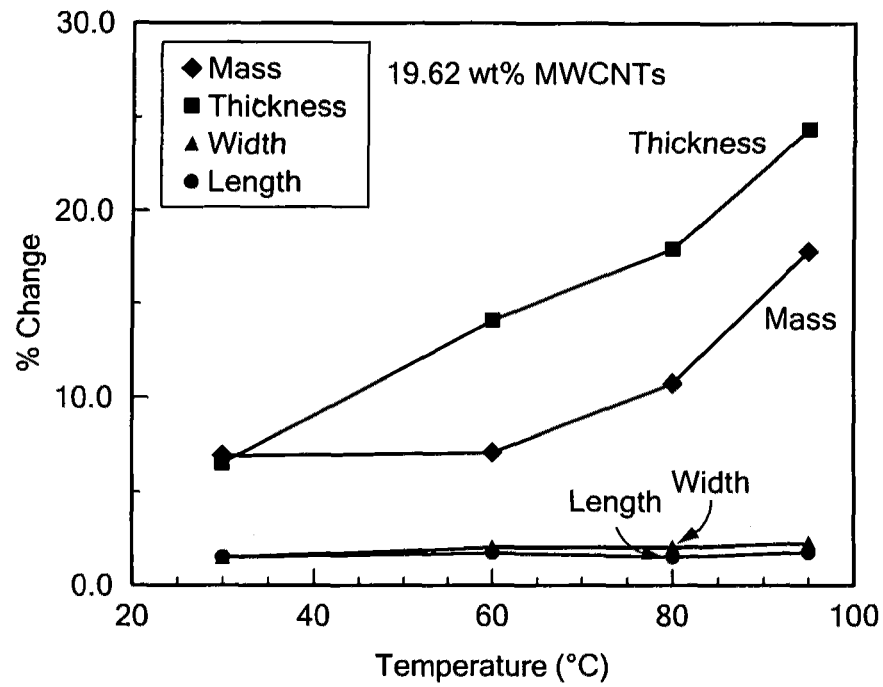
FIG. 19 is a graph depicting the dimensional stability, at various temperatures, of a membrane of the present invention prepared using 19.62 wt % multi-walled carbon nanotubes and 1100 EW PFSA, as discussed in Example 6.
Figure 20:
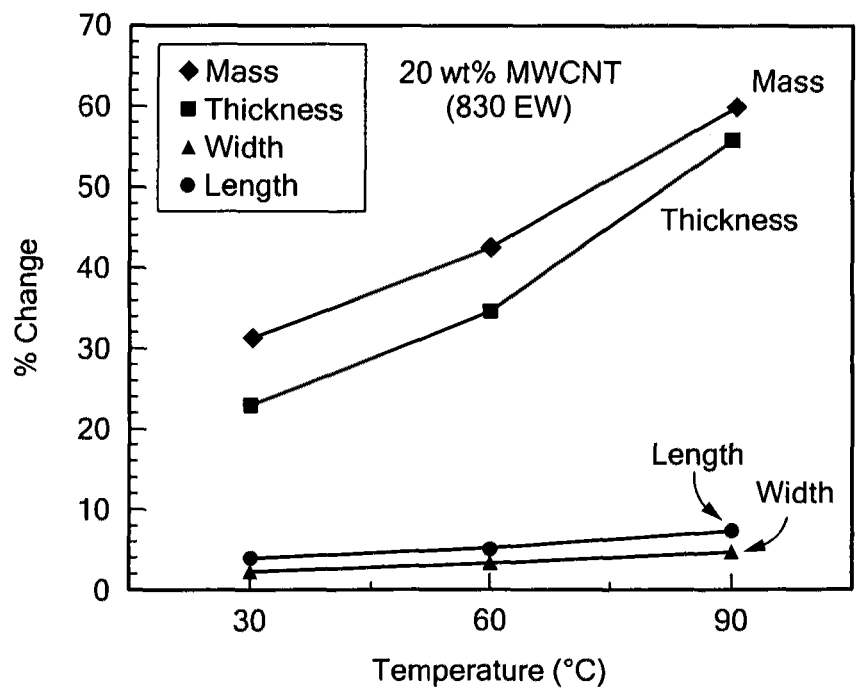
FIG. 20 is a graph depicting the dimensional stability, at various temperatures, of a membrane of the present invention prepared using 20 wt % multi-walled carbon nanotubes and 830 EW PFSA, as discussed in Example 6.
Figure 21:
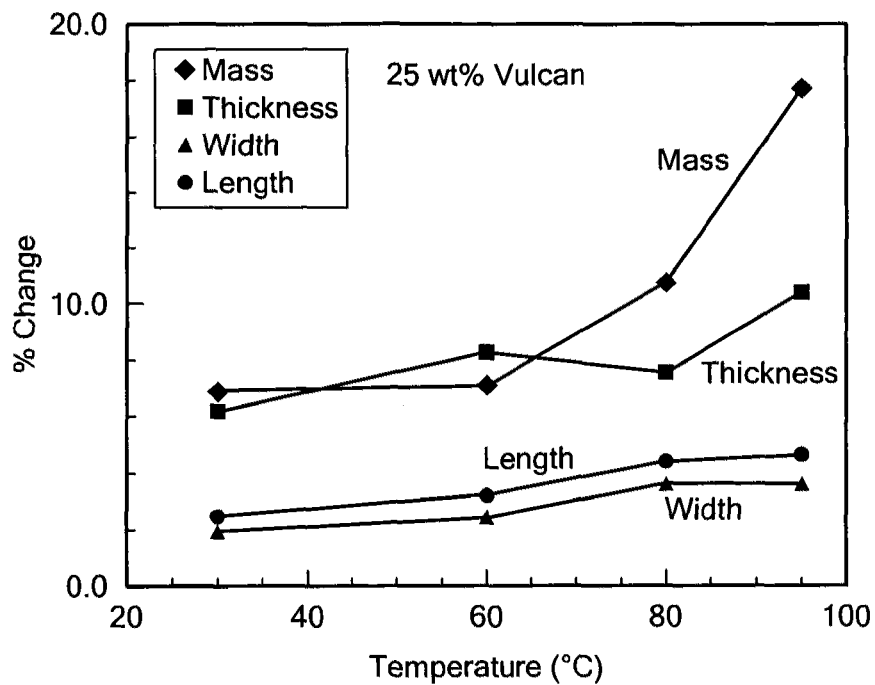
FIG. 21 is a graph depicting the dimensional stability, at various temperatures, of a membrane prepared using 25 wt % VULCAN carbon black and 1100 EW PFSA, as discussed in Example 6.
Figure 22:
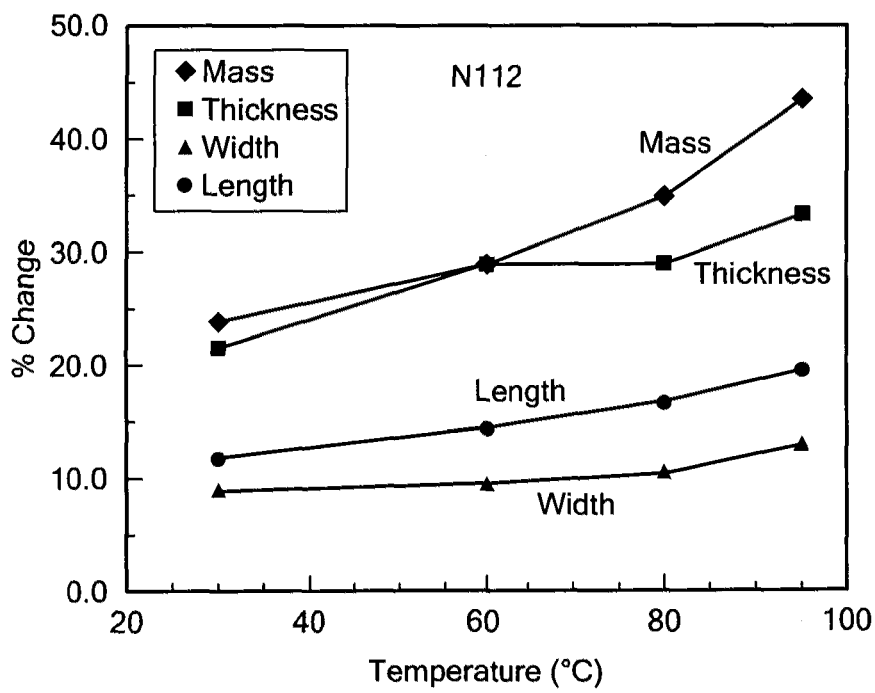
FIG. 22 is a graph depicting the dimensional stability, at various temperatures, of a NAFION®-112 PFSA membrane, as discussed in Example 6.

As part of the physical property characterization, the dimensional stability of composite WaMMs soaked in water for 24 hours at various temperatures was also measured. FIG. 19 shows that compositing multi-walled carbon nanotubes in the 1100 EW PFSA matrix had a strong effect on the membrane's water uptake and dimensional stability properties. For example, the change in width and length for a 19.6 wt % MWCNT-WaMM remained virtually unchanged after the sample was soaked in 30° C. to 95° C. water. Instead, the dimensional change mostly occurred along the membrane's thickness direction (thickness change: 6.6% in 30° C. water to 24.5% in 95° C. water). By comparison, as seen in FIG. 20, WaMMs made with 830 EW PFSA showed significantly higher water uptake (weight change ~60% and thickness change ~55% in 90° C. water) as compared to WaMMs prepared with 1100 EW PFSA. As seen in FIG. 21, VULCAN carbon-black-filled WaMMs showed minimal dimensional changes along the length and width directions and lower levels of water uptake (weight change ~18.5% and thickness change ~14.0% in 95° C. water) as compared to MWCNT-WaMMs. As seen in FIG. 22, a NAFION® 112 membrane, tested as a control sample, showed higher degrees of water uptake and swelling as compared to the MWCNT- and Vulcan-filled WaMMs. This sample showed a 19.6% change in length, a 12.7% change in width, and a 43.8% change in mass after soaking in 95° C. water. Overall, these results indicate that MWCNT fillers potentially offer a real benefit in the mechanical durability of WaMMs in electrochemical devices. For example, the 69% strain at break measured from tensile tests of ~20 wt % MWCNT-WaMMs is well above the length and width dimensional changes (<2.5%) observed from water uptake studies to ensure that membrane rupture is minimized during electrolyzer or fuel cell applications.

Example 7

Wet-Dry Cycling of Composite WaMMs

To test the durability of MWCNT-WaMMs, wet-thy cycling tests were performed in which membranes were sealed in a custom-built test cell held at 80° C. which provides an alternating flow of super-saturated air (dew point 10° C. above operating temperature) and dry air at 2-min intervals each across the membrane surface to simulate repeated start/stop cycles during electrolyzer operation. After 20 cycles of dry and humid air flow, pinholes through the membrane film were tested for by measuring gas crossover after pressurizing one side of the membrane with air and keeping the opposite side ambient. A WaMM was considered to have failed if at least 2 cm³/min of gas crossover was measured across the ambient side of the membrane. MWCNTs-WaMMs made with 1100-EW PFSA were exposed to over 2400 wet-dry cycles without pinhole failures. MWCNT-WaMMs made with 830 EW PFSA were also very durable and underwent over 1000 wet-dry cycles without membrane failure. By comparison, a 25 wt % VULCAN carbon black-WaMM tested under the same conditions could not withstand the same number of wet-dry cycles and failed during the early stages of testing (<20 cycles).

Example 8

Single-Cell Testing of Composite WaMMs

The performance of conductive WaMMs was also evaluated by building and testing single cells in a vapor-feed electrolyzer configuration. Cells were built according to the specifications shown in Table 3 below.

TABLE 3

| | MEA | | | | WaMM | | | Cathode Compartment | | | Run Details | |
|---|---|---|---|---|---|---|---|---|---|---|---|---|
| Build ID | EW | DSM | wt % Pt | Thickness (mil) | Carbon Type | wt % | EW | Thickness (mil) | Thickness (mil) | Pressure (psig) | Temp (° C.) | Failure Mode | Hrs |
| 1 | 830 | No | 1 | 2.19 | Vulcan | 25 | 1100 | 3.28 | 12 | Ambient | 80, 95 | MEA Electrical Short/ Pinholes | 25 |

TABLE 3-continued

| | MEA | | | | WaMM | | | | Cathode Compartment | Run Details | | | |
|---|---|---|---|---|---|---|---|---|---|---|---|---|---|
| Build ID | EW | DSM | wt % Pt | Thickness (mil) | Carbon Type | wt % | EW | Thickness (mil) | Thickness (mil) | Pressure (psig) | Temp (° C.) | Failure Mode | Hrs |
| 2 | 830 | No | 1 | 2.82 | MWCNT | 20 | 1100 | 2.14 | 12 | Ambient, 100, 200 | 80 | MEA Electrical Short | 31 |
| 3 | 830 | Yes | 1 | 3.16 | MWCNT | 20 | 1100 | 2.42 | 12 | Ambient, 100, 200, 350, 450 | 80, 95 | MEA Pinhole | 56 |
| 4 | 830 | Yes | 1 | 2.7 | MWCNT | 20 | 1100 | 2.42 | 6 | Ambient, 100, 200, 350, 500 | 25, 80, 95 | MEA Electrical Short | 30 |

Figure 23:
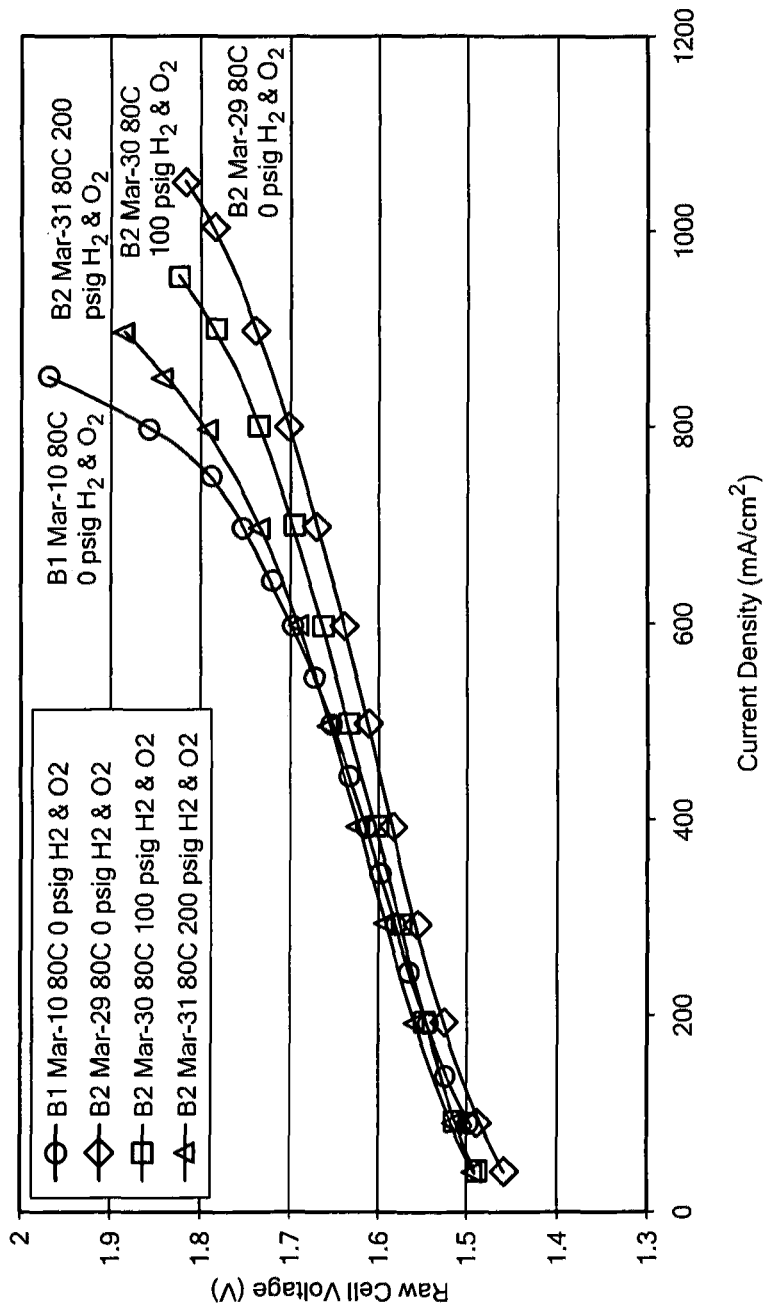
FIG. 23 is a graph depicting the performance of various electrolyzer cells, as discussed in Example 8.

Builds 1 and 2 enabled a comparison of the performance of VULCAN carbon black-WaMMs and MWCNT-WaMMs. With the design goal of a full stack operating at 2-3 kW and 120 V (16-25 A) in mind, a 50 cm$^2$ platform was implemented. This allowed for nominal operating currents of 300-500 mA/cm$^2$ (though currents up to 1000 mA/cm$^2$ were readily tested), which is a good range for maximum efficiency at high pressures. A set of hardware rated to 400 psi and 1000 psi were utilized. In this stack design, fluids were radially ported in lightweight polysulfone frames. The hydrogen was transported through carbon fiber paper diffusion media out of the cell via a tab that leads to the port hole and out of the cell. Several frames were machined in order to test different diffusion media tabs with thickness values of 12 mil, 6 mil, 3 mil, and 0 mil. The oxygen's egress was a set of radial holes that led to the axial port hole and out of the cell. The water compartment frame was composed in a similar manner to the oxygen frame. As shown in FIG. 23, at 80° C. and 0 psig operating conditions, the MWCNT-WaMM from build 2 exhibited comparable performance to the VULCAN-WaMM from build 1. The substantial improvement in mechanical properties of MWCNT-WaMMs enabled these membranes to be reused in different cell builds. For example, the MWCNT-WaMM from build 3 was reused in build 4. This was not possible with VULCAN cabon black-WaMMs because they easily ruptured during the cell build and testing.

Figure 24:
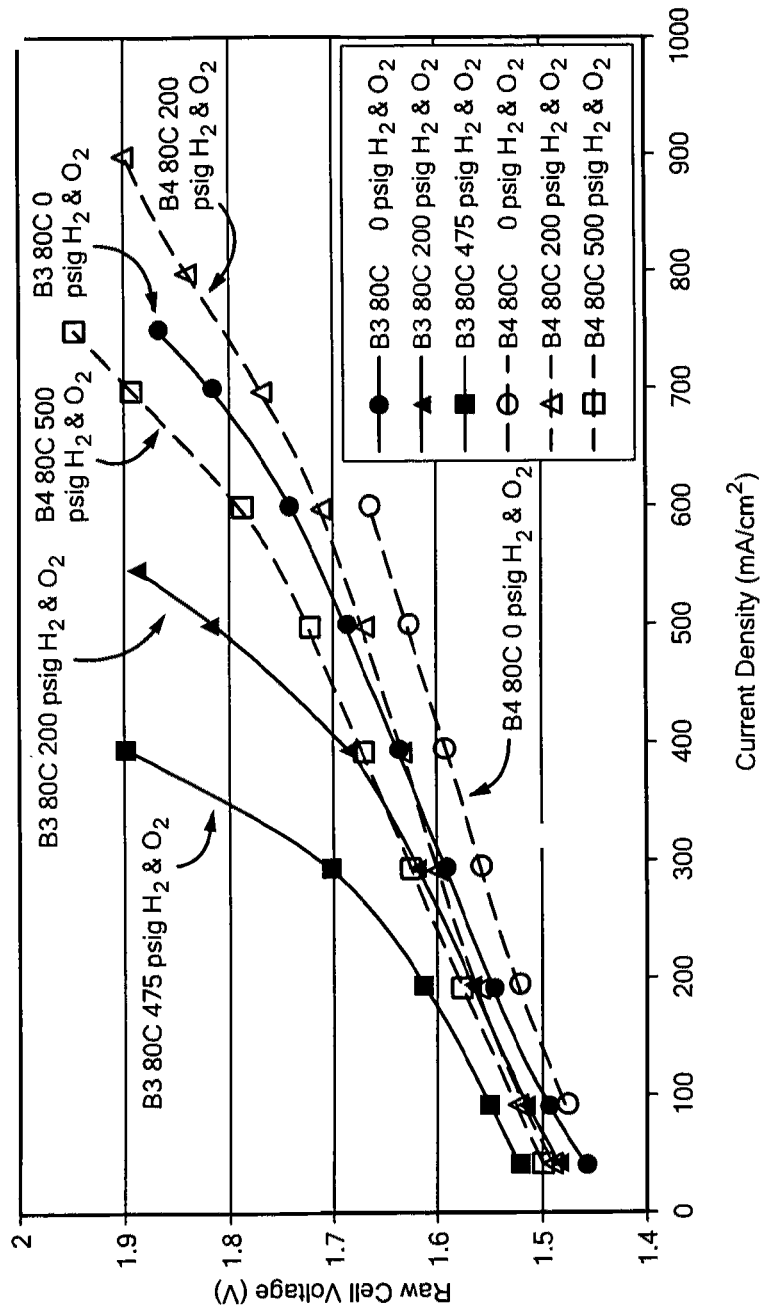
FIG. 24 is a graph depicting the performance of various electrolyzer cells, as discussed in Example 8.

The data in FIG. 24 shows that electrolyzer performance improved with decreasing thickness of the diffusion media between the WaMM and the MEA. Results from builds 3 and 4 in FIG. 24 further demonstrate the robustness of MWCNT-based WaMMs. In fact, a MWCNT-WaMM withstood nearly 100 hours of testing before the MEA failed. In all tests that were conducted, observed failures were due to electrical shorts or pinholes in the MEA and did not occur because of damage to the MWCNT-WaMMs. In other words, the limiting current density is dependent on the thickness of the diffusion media. Additionally, as operating pressure increases, the limiting current density decreases. At the same time, because high pressure gases hold less water, the amount of water leaving the cell with the humidified product gases is drastically reduced, thereby decreasing the water flux requirements for operation at a given current. In summary, MWCNT-WaMMs exhibited comparable, if not improved, performance compared to VULCAN-WaMMs and were far superior in terms of their mechanical durability and ability to endure performance testing and multiple builds without failure.

The embodiments of the present invention recited herein are intended to be merely exemplary and those skilled in the art will be able to make numerous variations and modifications to it without departing from the spirit of the present invention. All such variations and modifications are intended to be within the scope of the present invention as defined by the claims appended hereto.

What is claimed is:

1. An electrochemical device comprising:
(a) a polymer electrolyte membrane, said polymer electrolyte membrane having opposing first and second faces;
(b) an anode electrically coupled to the first face of said polymer electrolyte membrane;
(c) a cathode electrically coupled to the second face of said polymer electrolyte membrane;
(d) an anodic gas diffusion medium defining an anode chamber in fluid communication with said anode, said anodic gas diffusion medium having opposing first and second faces, said first face facing towards said anode;
(e) a cathodic gas diffusion medium defining a cathode chamber in fluid communication with said cathode, said cathodic gas diffusion medium having opposing first and second faces, said first face facing towards said cathode; and
(f) a first membrane, said first membrane being in contact with said second face of said anodic gas diffusion medium, said first membrane being electrically-conductive, non-porous, permeable to liquids, and substantially impermeable to gases, and comprising a solid polymer electrolyte and a non-particulate, electrically-conductive material, wherein said non-particulate, electrically-conductive material comprises carbon nanotubes, wherein said carbon nanotubes have an aspect ratio in the range of about 5 to about 1,000,000, wherein said carbon nanotubes are aligned in a film sheet direction, and wherein said first membrane is prepared by a process comprising mixing said carbon nanotubes in a dispersion of the solid polymer electrolyte to yield an ink, then coating the ink onto a substrate by solvent-casting to form a coated substrate, and then heat-pressing the coated substrate to form a film.

2. The electrochemical device as claimed in claim 1 wherein said first membrane is permeable to liquid but impermeable to gas.

3. The electrochemical device as claimed in claim 1 wherein the solid polymer electrolyte comprises at least one cation exchange functional group selected from the group consisting of $-SO_3^-$, $-SO_2NH^+$, $-PO_3^{2-}$, and $-CO_2^-$.

4. The electrochemical device as claimed in claim 1 wherein the solid polymer electrolyte is perfluorosulfonic acid.

5. The electrochemical device as claimed in claim 1 wherein the solid polymer electrolyte comprises an $-NH_2^+$ anion exchange functional group.

6. The electrochemical device as claimed in claim 1 wherein the non-particulate, electrically-conductive material further comprises at least one type of material selected from the group consisting of carbon nanofibers and metal nanowires.

7. The electrochemical device as claimed in claim 1 wherein the carbon nanotubes comprise single-walled carbon nanotubes.

8. The electrochemical device as claimed in claim 1 wherein the carbon nanotubes comprise double-walled carbon nanotubes.

9. The electrochemical device as claimed in claim 1 wherein the carbon nanotubes comprise multi-walled carbon nanotubes.

10. The electrochemical device as claimed in claim 1 wherein the carbon nanotubes have a length in the range of about 0.50 μm to about 200 μm.

11. The electrochemical device as claimed in claim 1 wherein the carbon nanotubes are non-functionalized.

12. The electrochemical device as claimed in claim 1 wherein the carbon nanotubes comprise at least one functional group selected from the group consisting of $-COOH$, $-PO_4^-$, $-SO_3H$, $-SH$, $-NH_2$, tertiary amines, quaternary amines, $-CHO$, $-OH$, $-NO_2$, and $-PO_3^2$.

13. The electrochemical device as claimed in claim 1 wherein the non-particulate, electrically-conductive material further comprises carbon nanofibers.

14. The electrochemical device as claimed in claim 1 wherein the non-particulate, electrically-conductive material further comprises metal nanowires.

15. The electrochemical device as claimed in claim 1 further comprising a second membrane, said second membrane being in contact with said cathodic gas diffusion medium and being electrically-conductive, non-porous, and selectively-permeable.

16. The electrochemical device as claimed in claim 1 wherein the first membrane has a carbon loading of about 5 wt % to about 30 wt %.

17. The electrochemical device as claimed in claim 1 wherein the first membrane has a carbon loading of about 20 wt % to about 25 wt %.

18. The electrochemical device as claimed in claim 1 wherein the carbon nanotubes comprise a combination of at least two types of carbon nanotubes selected from the group consisting of single-walled carbon nanotubes, double-walled carbon nanotubes, and multi-walled carbon nanotubes.

19. The electrochemical device as claimed in claim 18 wherein the carbon nanotubes have a diameter in the range of about 0.4 nm to about 80 nm.

20. The electrochemical device as claimed in claim 19 wherein the carbon nanotubes have a diameter in the range of about 0.50 nm to about 50 nm.

21. The electrochemical device as claimed in claim 1 wherein the carbon nanotubes have a diameter in the range of about 0.20 nm to about 100 nm.

22. The electrochemical device as claimed in claim 21 wherein the carbon nanotubes have a diameter in the range of about 0.5 nm to about 60 nm.

23. The electrochemical device as claimed in claim 1 wherein the first membrane further comprises electrically-conductive particles.

24. The electrochemical device as claimed in claim 23 wherein the electrically-conductive particles are selected from the group consisting of carbon particles, metal particles, and combinations thereof.

25. The electrochemical device as claimed in claim 1 further comprising a first fluid chamber comprising opposing first and second faces, said first face being in contact with said first membrane opposite to said anodic gas diffusion medium.

26. The electrochemical device as claimed in claim 25 further comprising a first electrically-conductive, non-porous sheet in contact with said second face of said first fluid chamber.

27. An electrochemical device stack comprising a plurality of the electrochemical devices of claim 1 arranged in a bipolar stack.

28. The electrochemical device as claimed in claim 1 wherein the electrochemical device is an electrolyzer.

29. An electrochemical device comprising:
(a) a polymer electrolyte membrane, said polymer electrolyte membrane having opposing first and second faces;
(b) an anode electrically coupled to the first face of said polymer electrolyte membrane;
(c) a cathode electrically coupled to the second face of said polymer electrolyte membrane;
(d) an anodic gas diffusion medium defining an anode chamber in fluid communication with said anode, said anodic gas diffusion medium having opposing first and second faces, said first face facing towards said anode;
(e) a cathodic gas diffusion medium defining a cathode chamber in fluid communication with said cathode, said cathodic gas diffusion medium having opposing first and second faces, said first face facing towards said cathode;
(f) a first membrane, said first membrane being in contact with said second face of said cathodic gas diffusion medium, said first membrane being electrically-conductive, non-porous, permeable to liquids, and substantially impermeable to gases, and comprising a solid polymer electrolyte and a non-particulate, electrically-conductive material, wherein said non-particulate, electrically-conductive material comprises carbon nanotubes, wherein said carbon nanotubes have an aspect ratio in the range of about 5 to about 1,000,000, wherein said carbon nanotubes are aligned in a film sheet direction, and wherein said first membrane is prepared by a process comprising mixing said carbon nanotubes in a dispersion of the solid polymer electrolyte to yield an ink, then coating the ink onto a substrate by solvent-casting to form a coated substrate, and then heat-pressing the coated substrate to form a film; and
(g) wherein, during operation of the electrochemical device, gaseous oxygen is present within the cathodic gas diffusion medium.

30. The electrochemical device as claimed in claim 29 wherein said first membrane is permeable to liquid but impermeable to gas.

31. The electrochemical device as claimed in claim 29 wherein the solid polymer electrolyte comprises at least one cation exchange functional group selected from the group consisting of $-SO_3^-$, $-SO_2NH^+$, $-PO_3^{2-}$, and $-CO_2^-$.

32. The electrochemical device as claimed in claim 29 wherein the solid polymer electrolyte is perfluorosulfonic acid.

33. The electrochemical device as claimed in claim 29 wherein the solid polymer electrolyte comprises an —$NH_2^+$ anion exchange functional group.

34. The electrochemical device as claimed in claim 29 wherein the non-particulate, electrically-conductive material further comprises at least one type of material selected from the group consisting of carbon nanofibers and metal nanowires.

35. The electrochemical device as claimed in claim 29 wherein the carbon nanotubes comprise single-walled carbon nanotubes.

36. The electrochemical device as claimed in claim 29 wherein the carbon nanotubes comprise double-walled carbon nanotubes.

37. The electrochemical device as claimed in claim 29 wherein the carbon nanotubes comprise multi-walled carbon nanotubes.

38. The electrochemical device as claimed in claim 29 wherein the carbon nanotubes have a length in the range of about 0.50 μm to about 200 μm.

39. The electrochemical device as claimed in claim 29 wherein the carbon nanotubes are non-functionalized.

40. The electrochemical device as claimed in claim 29 wherein the carbon nanotubes comprise at least one functional group selected from the group consisting of —COOH, —$PO_4^-$, —$SO_3H$, —SH, —$NH_2$, tertiary amines, quaternary amines, —CHO, —OH, —$NO_2$, and —$PO_3^2$.

41. The electrochemical device as claimed in claim 29 wherein the non-particulate, electrically-conductive material further comprises carbon nanofibers.

42. The electrochemical device as claimed in claim 29 wherein the non-particulate, electrically-conductive material further comprises metal nanowires.

43. The electrochemical device as claimed in claim 29 wherein the carbon nanotubes comprise a combination of at least two types of carbon nanotubes selected from the group consisting of single-walled carbon nanotubes, double-walled carbon nanotubes, and multi-walled carbon nanotubes.

44. The electrochemical device as claimed in claim 43 wherein the carbon nanotubes have a diameter in the range of about 0.4 nm to about 80 nm.

45. The electrochemical device as claimed in claim 44 wherein the carbon nanotubes have a diameter in the range of about 0.50 nm to about 50 nm.

46. The electrochemical device as claimed in claim 29 wherein the carbon nanotubes have a diameter in the range of about 0.20 nm to about 100 nm.

47. The electrochemical device as claimed in claim 46 wherein the carbon nanotubes have a diameter in the range of about 0.5 nm to about 60 nm.

48. The electrochemical device as claimed in claim 29 wherein the first membrane further comprises electrically-conductive particles.

49. The electrochemical device as claimed in claim 48 wherein the electrically-conductive particles are selected from the group consisting of carbon particles, metal particles, and combinations thereof.

50. The electrochemical device as claimed in claim 29 further comprising a first fluid chamber comprising opposing first and second faces, said first face being in contact with said first membrane opposite to said cathodic gas diffusion medium.

51. The electrochemical device as claimed in claim 50 further comprising a first electrically-conductive, non-porous sheet in contact with said second face of said first fluid chamber.

52. An electrochemical device stack comprising a plurality of the electrochemical devices of claim 29 arranged in a bipolar stack.

53. The electrochemical device as claimed in claim 29 wherein the electrochemical device is a fuel cell.

54. An electrochemical device comprising:
(a) a polymer electrolyte membrane, said polymer electrolyte membrane having opposing first and second faces;
(b) an anode electrically coupled to the first face of said polymer electrolyte membrane;
(c) a cathode electrically coupled to the second face of said polymer electrolyte membrane;
(d) an anodic gas diffusion medium defining an anode chamber in fluid communication with said anode, said anodic gas diffusion medium having opposing first and second faces, said first face facing towards said anode;
(e) a cathodic gas diffusion medium defining a cathode chamber in fluid communication with said cathode, said cathodic gas diffusion medium having opposing first and second faces, said first face facing towards said cathode;
(f) a first membrane, said first membrane being in contact with said second face of said anodic gas diffusion medium, said first membrane being electrically-conductive, non-porous, permeable to liquids, and substantially impermeable to gases, and comprising a solid polymer electrolyte and a non-particulate, electrically-conductive material, wherein said non-particulate, electrically-conductive material comprises carbon nanotubes, wherein said carbon nanotubes have an aspect ratio in the range of about 5 to about 1,000,000 and wherein said carbon nanotubes are aligned in a film sheet direction, and wherein said first membrane is prepared by a process comprising mixing said carbon nanotubes in a dispersion of the solid polymer electrolyte to yield an ink, coating the ink onto a substrate by solvent-casting to form a coated substrate, and then heat-pressing the coated substrate;
(g) a second membrane, wherein said second membrane is in contact with said cathodic gas diffusion medium and is electrically-conductive, non-porous, and selectively-permeable, wherein said second membrane comprises a solid polymer electrolyte and a non-particulate, electrically-conductive material, and wherein said non-particulate, electrically-conductive material comprises carbon nanotubes; and
(h) wherein, during operation of the electrochemical device, gaseous oxygen is present within the cathodic gas diffusion medium.

* * * * *